(12) United States Patent
Bailey et al.

(10) Patent No.: US 12,282,854 B2
(45) Date of Patent: Apr. 22, 2025

(54) BATCH SELECTION POLICIES FOR TRAINING MACHINE LEARNING MODELS USING ACTIVE LEARNING

(71) Applicant: Sanofi, Paris (FR)

(72) Inventors: Michael Bailey, Toronto (CA); Ziv Bar-Joseph, Cambridge, MA (US); Sven Jager, Frankfurt am Main (DE); Ruijiang Li, Shanghai (CN); Saeed Moayedpour, Cambridge, MA (US)

(73) Assignee: Sanofi, Paris (FR)

( * ) Notice: Subject to any disclaimer, the term of this patent is extended or adjusted under 35 U.S.C. 154(b) by 0 days.

(21) Appl. No.: 18/654,681

(22) Filed: May 3, 2024

(65) Prior Publication Data

US 2024/0354655 A1 Oct. 24, 2024

Related U.S. Application Data

(63) Continuation of application No. 18/640,851, filed on Apr. 19, 2024.

(30) Foreign Application Priority Data

Dec. 13, 2023 (EP) .................................... 23315451

(51) Int. Cl.
*G06N 3/082* (2023.01)
*G06N 3/045* (2023.01)
(Continued)

(52) U.S. Cl.
CPC ............. *G06N 3/082* (2013.01); *G06N 3/045* (2023.01); *G06N 3/091* (2023.01); *G06N 20/00* (2019.01)

(58) Field of Classification Search
None
See application file for complete search history.

(56) References Cited

U.S. PATENT DOCUMENTS

| 11,436,523 B2 * | 9/2022 | Erenrich | G06N 5/04 |
| 2022/0027536 A1 * | 1/2022 | Dutta | G06N 20/00 |
| 2024/0354575 A1 | 10/2024 | Bailey et al. | |

FOREIGN PATENT DOCUMENTS

WO   WO 2024/220902 A1   10/2024

OTHER PUBLICATIONS

Ash et al., "Deep batch active learning by diverse, uncertain gradient lower bounds," CoRR, Submitted on Feb. 24, 2020, arXiv:1906.03671v2, 26 pages.
(Continued)

*Primary Examiner* — Daniel T Pellett
(74) *Attorney, Agent, or Firm* — Fish & Richardson P.C.

(57) ABSTRACT

Methods, systems, and apparatus, including computer programs encoded on a computer storage medium, for training a machine learning model. In one aspect, a method comprises: generating a set of candidate batches of model inputs; generating, for each candidate batch of model inputs, a respective score for the candidate batch of model inputs that characterizes: (i) an uncertainty of the machine learning model in generating predicted labels for the model inputs in the candidate batch of model inputs, and (ii) a diversity of the model inputs in the candidate batch of model inputs; and selecting the current batch of model inputs from the set of candidate batches of model inputs based on the scores; and training the machine learning model on at least the current batch of model inputs.

30 Claims, 11 Drawing Sheets

Related U.S. Application Data

(60) Provisional application No. 63/461,175, filed on Apr. 21, 2023.

(51) Int. Cl.
    *G06N 3/091* (2023.01)
    *G06N 20/00* (2019.01)

(56) References Cited

OTHER PUBLICATIONS

Bailey et al., "Deep Batch Active Learning for Drug Discovery," bioRxiv, Oct. 26, 2023, pp. 1-15.
Holzmüller et al., "A Framework and Benchmark for Deep Batch Active Learning for Regression," CoRR, Submitted on Aug. 18, 2022, axXiv:2203.09410v2, 78 pages.
International Search Report and Written Opinion in International Appln. No. PCT/US2024/025544, mailed on Jul. 11, 2024, 16 pages.
Ash et al., "Deep batch active learning by diverse, uncertain gradient lower bounds," CoRR, Submitted on Jun. 9, 2019, arXiv:1906.03671v2, 26 pages.
Holzmüller et al., "A framework and benchmark for deep batch active learning for regression," Journal of Machine Learning Research, 2023, 24(164):1-81.
Ash et al., "Gone fishing: Neural active learning with fisher embeddings," Advances in Neural Information Processing Systems, Dec. 6, 2021, 34:8927-8939.
Azimi et al., "Batch Active Learning via Coordinated Matching," CoRR, Submitted on Jun. 27, 2012, arXiv:1206.6458, 8 pages.
Bailey et al., "Deep Batch Active Learning for Drug Discovery," bioRxiv, Jul. 29, 2023, pp. 1-16.
Cai et al., "Transfer Learning for Drug Discovery," Journal of Medicinal Chemistry, Jul. 16, 2020, 63(16):8683-8694.
Chuang et al., "Learning Molecular Representations for Medicinal Chemistry: Miniperspective," Journal of Medicinal Chemistry, May 4, 2020, 63(16):8705-8722.
Cohn et al., "Active Learning with Statistical Models," Journal of Artificial Intelligence Research, Mar. 1, 1996, 4:129-145.
Cohn et al., "Improving Generalization with Active Learning," Machine Learning, May 1994, 15:201-221.
Dagan et al., "Committee-based sampling for training probabilistic classifiers," Machine Learning Proceedings 1995, Jan. 1, 1995, pp. 150-157.
Daxberger et al., "Laplace Redux-Effortless Bayesian Deep Learning," Advances in Neural Information Processing Systems, Dec. 6, 2021, 34:1-15.
Deepchem.readthedocs.io [online], "Model Classes," Nov. 27, 2020, retrieved on May 16, 2024, retrieved from URL<https://deepchem.readthedocs.io/en/latest/api_reference/models.html#graphcon vmodel>, 116 pages.
Ding et al., "Active Learning for Drug Design: A Case Study on the Plasma Exposure of Orally Administered Drugs," Journal of Medicinal Chemistry, Nov. 15, 2021, 64(22):16838-16853.
Duvenaud et al., "Convolutional networks on graphs for learning molecular fingerprints," Advances in Neural Information Processing Systems, 2015, 28:1-9.
Gal et al. "Dropout As a Bayesian Approximation: Representing Model Uncertainty in Deep Learning," Proceedings of The 33rd International Conference on Machine Learning, Jun. 11, 2016, 48:1-10.
Gaulton et al., "ChEMBL: a large-scale bioactivity database for drug discovery," Nucleic Acids Research, Jan. 1, 2012, 40(D1):D1100-1107.
Github.com [online], "deepchem," Jul. 23, 2017, retrieved on May 16, 2024, retrieved from URL<https://github.com/deepchem/deepchem>, 5 pages.
Grebner et al., "Artificial Intelligence in Compound Design," Methods Molecular Biology, 2022, pp. 349-382.
Haghighatlari et al., "ChemML: A Machine Learning and Informatics Program Package for the Analysis, Mining, and Modeling of Chemical and Materials Data," Wiley Interdisciplinary Reviews: Computational Molecular Science, Jul. 2020, 10(4):e1458.
Hessler et al., "Artificial Intelligence in Drug Design," Molecules, Oct. 2, 2018, 23(10):2520.
Hinton et al., "Improving neural networks by preventing co-adaptation of feature detectors," CoRR, Submitted on Jul. 3, 2012, arXiv:1207.0580, 18 pages.
Huang et al., "Artificial intelligence foundation for therapeutic science," Nature Chemical Biology, Oct. 2022, 18(10):1033-1036.
Kearnes et al., "Molecular graph convolutions: moving beyond fingerprints," Journal of Computer-Aided Molecular Design, Aug. 2016, 30:595-608.
Kendall et al., "What Uncertainties Do We Need in Bayesian Deep Learning for Computer Vision?," Advances in Neural Information Processing Systems, 2017, 30:1-11.
Kingma et al., "Adam: A Method for Stochastic Optimization," CoRR, Submitted on Dec. 22, 2014, arXiv:1412.6980, 9 pages.
Kipf et al., "Semi-Supervised Classification with Graph Convolutional Networks," CoRR, Submitted on Dec. 22, 2014, arXiv:1609.02907, 10 pages.
Lakshminarayanan et al., "Simple and Scalable Predictive Uncertainty Estimation using Deep Ensembles," Advances in Neural Information Processing Systems, 2017, 30:1-12.
Lewis et al., "A Sequential Algorithm for Training Text Classifiers," Annual International ACM SIGIR Conference on Research and Development in Information Retrieval, Jul. 24, 1994, pp. 3-12.
Matter et al., "Design and Quantitative Structure-Activity Relationship of 3-Amidinobenzyl-1H-indole-2-carboxamides as Potent, Nonchiral, and Selective Inhibitors of Blood Coagulation Factor Xa," Journal of Medicinal Chemistry, Jun. 20, 2002, 45(13):2749-2769.
Matter et al., "Structural Requirements for Factor Xa Inhibition by 3-Oxybenzamides with Neutral P1 Substituents: Combining X-ray Crystallography, 3D-QSAR, and Tailored Scoring Functions," Journal of Medicinal Chemistry, May 5, 2005, 48(9):3290-3312.
Matter et al., "Structure-based design and optimization of potent renin inhibitors on 5- or 7-azaindole-scaffolds," Bioorganic & Medicinal Chemistry Letters, Sep. 15, 2011, 21(18):5487-5492.
Mehrjou et al., "Genedisco: A Benchmark for Experimental Design in Drug Discovery," CoRR, Submitted on Oct. 22, 2021, arXiv:2110.11875, 29 pages.
Nazaré et al., "Factor Xa inhibitors based on a 2-carboxyindole scaffold: SAR of neutral P1 substituents," Bioorganic & Medicinal Chemistry Letters, Aug. 16, 2004, 14(16):4191-4195.
Nazaré et al., "Fragment Deconstruction of Small, Potent Factor Xa Inhibitors: Exploring the Superadditivity Energetics of Fragment Linking in Protein-Ligand Complexes," Angewandte Chemie International Edition, Jan. 23, 2012, 51(4):905-911.
Nazaré et al., "Probing the Subpockets of Factor Xa Reveals Two Binding Modes for Inhibitors Based on a 2-Carboxyindole Scaffold: A Study Combining Structure-Activity Relationship and X-ray Crystallography," Journal of Medicinal Chemistry, Jul. 14, 2005, 48(14):4511-4525.
Nemenman et al., "Entropy and inference, revisited," Advances in Neural Information Processing Systems, 2001, 8 pages.
Nguyen et al., "Active learning using pre-clustering," In Proceedings of the Twenty-First International Conference on Machine Learning, Jul. 4, 2004, pp. 1-8.
Ohsaka, "On the Parameterized Intractability of Determinant Maximization," CoRR, Submitted on Sep. 26, 2022, arXiv:2209.12519, 30 pages.
Pertusi et al., "Predicting novel substrates for enzymes with minimal experimental effort with active learning," Metabolic Engineering, Nov. 1, 2017, 44:171-181.
Reker et al., "Active learning for computational chemogenomics," Future Medicinal Chemistry, Mar. 6, 2017, 9(4):381-402.
Scheiper et al., "Discovery and optimization of a new class of potent and non-chiral indole-3-carboxamide-based renin inhibitors," Bioorganic & Medicinal Chemistry Letters, Nov. 1, 2010, 20(21):6268-6272.

(56) References Cited

OTHER PUBLICATIONS

Scheiper et al., "Structure-based optimization of potent 4- and 6-azaindole-3-carboxamides as renin inhibitors," Bioorganic & Medicinal Chemistry Letters, Sep. 15, 2011, 21(18):5480-5486.
Settles, "Active Learning Literature Survey," Computer Sciences Department, University of Wisconsin-Madison, Jan. 9, 2009, 47 pages.
Sorkun et al., "AqSolDB, a curated reference set of aqueous solubility and 2D descriptors for a diverse set of compounds," Scientific Data, Aug. 8, 2019, 6(1):143.
Thompson et al., "Optimizing active learning for free energy calculations," Artificial Intelligence in the Life Sciences. Dec. 1, 2022, 2:100050.
Tynes et al., "Pairwise Difference Regression: A Machine Learning Meta-algorithm for Improved Prediction and Uncertainty Quantification in Chemical Search," Journal of Chemical Information and Modeling, Aug. 4, 2021, 61(8):3846-3857.
Wang et al., "ADME properties evaluation in drug discovery: prediction of Caco-2 cell permeability using a combination of NSGA-II and boosting, " Journal of Chemical Information and Modeling, Apr. 25, 2016, 56(4):763-773.
Weininger, "Smiles, a chemical language and information system. 1. Introduction to methodology and encoding rules," Journal of Chemical Information and Computer Sciences, Feb. 1, 1988, 28(1):31-36.
Weiss et al., "A survey of transfer learning," Journal of Big Data, May 2016, 3:(9)1-40.
Wu et al., "Computational Approaches in Preclinical Studies on Drug Discovery and Development," Frontiers in Chemistry, Sep. 11, 2020, 8:726.
Wu et al., "MoleculeNet: a benchmark for molecular machine learning," Chemical Science, 2018, 9(2):513-530.
Xiong et al., "ADMETlab 2.0: an integrated online platform for accurate and comprehensive predictions of ADMET properties," Nucleic Acids Research, Jul. 2, 2021, 49(W1):W5-W14.
Zaverkin et al., "Exploring chemical and conformational spaces by batch mode deep active learning," Digital Discovery, Jul. 2022, 1(5):605-620.

\* cited by examiner

NAME:
Matrix Metalloproteinase -8 Inhibitor I

SMILES:
O=C(NO)[C@@H]N(S(C2=CC=C(OC)C=C2)(=O)=O)CC3=CC=CC=C3Cl

Holo human MMP -8
(2OY4.pdb)

Ligand

| Dataset | COVDROP | COVLAP | k-means | BAIT | Random | Chron. | NC | % gain |
|---|---|---|---|---|---|---|---|---|
| Caco2 | 420 | 450 | 570 | 540 | 600 | - | 637 | 30.0 |
| Lipophilicity | 1440 | 1500 | 1560 | 1650 | 1650 | - | 2940 | 12.7 |
| HFE | 360 | 450 | 450 | 450 | 450 | - | 450 | 20.0 |
| Solubility | 2160 | 6810 | 5850 | 6988 | 5730 | - | 6988 | 62.3 |
| PPBR | 1050 | 450 | 450 | 420 | 510 | - | 1130 | - |
| GSK3β | 1260 | 2325 | 2325 | 2325 | 2325 | - | 2325 | 45.8 |
| MMP3 | 690 | 810 | 900 | 870 | 930 | - | 1280 | 25.8 |
| PPAR6 | 570 | 660 | 660 | 630 | 690 | - | 879 | 17.4 |
| A1AR | 570 | 540 | 600 | 630 | 630 | - | 952 | 9.5 |
| NAV17 | 1770 | 4004 | 4004 | 4004 | 4004 | - | 4004 | 55.8 |
| D2 | 2010 | 4797 | 4797 | 4797 | 4797 | - | 4797 | 58.1 |
| Renin | 150 | 240 | 270 | 300 | 330 | 390 | 422 | 54.5 |
| FXa | 750 | 1020 | 870 | 1026 | 990 | 1026 | 1026 | 24.2 |
| MMP-8 | 150 | 270 | 390 | 420 | 456 | 360 | 456 | 67.1 |
| PPAR6 | 420 | 300 | 570 | 390 | 570 | 600 | 614 | 26.3 |

FIG. 9

BATCH SELECTION POLICIES FOR TRAINING MACHINE LEARNING MODELS USING ACTIVE LEARNING

CROSS-REFERENCE TO RELATED APPLICATIONS

This application is a continuation of U.S. patent application Ser. No. 18/640,851, filed on Apr. 19, 2024, which claims priority to U.S. Provisional Patent Application No. 63/461,175, filed on Apr. 21, 2023, and EP patent application Ser. No. 23/315,451.7, filed on Dec. 13, 2023, the disclosures of which are incorporated herein by reference.

TECHNICAL FIELD

This specification relates to using active learning for training machine learning models.

BACKGROUND

Machine learning models receive an input and generate an output, e.g., a predicted output, based on the received input. Some machine learning models are parametric models and generate the output based on the received input and on values of the parameters of the model.

Some machine learning models are deep neural network models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that can train a machine learning model over a sequence of training iterations using a batch selection policy.

Throughout this specification, an "embedding" of an entity (e.g., a model input) can refer to a representation of the entity as an ordered collection of numerical values, e.g., a vector, matrix, or other tensor of numerical values.

Throughout this specification, a first neural network can be referred to as a "subnetwork" of a second neural network if the first neural network is included in the second neural network.

Throughout this specification, a "subject" can refer to an animal or a human.

Throughout this specification, a "batch" of data elements (e.g., model inputs to a machine learning model) can refer to a set of data elements, e.g., a set of 5, or 10, or 100, or 1000 data elements.

Throughout this specification, the "uncertainty" of a machine learning model in generating a predicted label for a model input can refer to a confidence of the machine learning model in the predicted label for the model input.

Throughout this specification, the "diversity" of model inputs in a batch of model inputs can characterize a level of correlation between predicted labels generated by a machine learning model for model inputs included in the batch of model inputs. More specifically, lower levels of correlation between the predicted labels of the model inputs in the batch can be indicative of higher batch diversity, and conversely, higher levels of correlation between the predicted labels of the model inputs in the batch can be indicative of a lower batch diversity.

According to a first aspect, there is provided a method performed by one or more computers, the method comprising: training a machine learning model over a sequence of training iterations, comprising, at each of a plurality of training iterations in the sequence of training iterations: selecting a current batch of model inputs for training the machine learning model at the training iteration, wherein the current batch of model inputs comprises a plurality of model inputs, wherein selecting the current batch of model inputs comprises: generating a set of candidate batches of model inputs; generating, for each candidate batch of model inputs, a respective score for the candidate batch of model inputs that characterizes: (i) an uncertainty of the machine learning model in the predicted labels for the model inputs in the candidate batch of model inputs, and (ii) a diversity of the model inputs in the candidate batch of model inputs; and selecting the current batch of model inputs from the set of candidate batches of model inputs based on the scores; obtaining a respective target label for each model input in the current batch of model inputs, wherein a target label for a model input defines a model output that should be generated by the machine learning model by processing the model input; and training the machine learning model with the current batch of model inputs using the target labels for the current batch of model inputs; and outputting the trained machine learning model.

In some implementations, for each candidate batch of model inputs, generating the score for the candidate batch of model inputs comprises: determining, for each pair of model inputs in the candidate batch of model inputs, a respective covariance between: (i) a predicted label for a first model input in the pair of model inputs, and (ii) a predicted label for a second model input in the pair of model inputs; and generating the score for the candidate batch of model inputs based on the respective covariance for each pair of model inputs in the candidate batch of model inputs.

In some implementations, generating the score for the candidate batch of model inputs based on the respective covariance for each pair of model inputs in the candidate batch of model inputs comprises: generating a determinant of a covariance matrix that comprises the respective covariance for each pair of model inputs in the candidate batch of model inputs; and determining the score for the candidate batch of model inputs based on the determinant of the covariance matrix.

In some implementations, determining the score for the candidate batch of model inputs based on the determinant of the covariance matrix comprises applying a logarithm to the determinant of the covariance matrix.

In some implementations, for each pair of model inputs in the candidate batch of model inputs, determining the covariance for the pair of model inputs comprises: generating a plurality of predicted labels for the first model input in the pair of model inputs using an ensemble of machine learning models; generating a plurality of predicted labels for the second model input in the pair of model inputs using the ensemble of machine learning models; and determining the covariance for the pair of model inputs based on: (i) the plurality of predicted labels for the first model input, and (ii) the plurality of predicted labels for the second model input.

In some implementations, the machine learning model is a neural network and the ensemble of machine learning models comprises a plurality of modified neural networks, wherein each modified neural network in the ensemble of machine learning models is a modified version of the neural network (e.g., having a different network topology).

In some implementations, each modified neural network in the ensemble of machine learning models is determined by dropping a respective set of parameters from the neural network.

In some implementations, generating the respective covariance for each pair of model inputs in the candidate batch of model inputs comprises: determining, for each of a plurality of pairs of model parameters of the machine learning model, a respective covariance between: (i) a first model parameter of the pair of model parameters, and (ii) a second model parameter of the pair of model parameters; and generating the covariances for the pairs of model inputs based on the covariances for the pairs of model parameters of the machine learning model.

In some implementations, the machine learning model is a neural network that comprises an: (i) an embedding subnetwork that is configured to process a model input to generate an embedding of the model input, and (ii) output layer that is configured to process the embedding of the model input to generate a predicted label for the model input.

In some implementations, generating the covariances for the pairs of model inputs based on the covariances for the pairs of model parameters of the machine learning model comprises, for each pair of model inputs comprising a first model input and a second model input: generating an embedding of the first model input using the embedding subnetwork; generating an embedding of the second model input using the embedding subnetwork; and generating the covariance for the pair of model inputs based on the embedding of the first model input, the embedding of the second model input, and covariances for pairs of model parameters included in the output layer of the machine learning model.

In some implementations, for each pair of model inputs comprising a first model input and a second model input, generating the covariance for the pair of model inputs comprises computing a matrix product between: (i) the embedding of the first model input, (ii) a covariance matrix that comprises the covariances for pairs of model parameters included in the output layer of the machine learning model, and (iii) the embedding of the second model input.

In some implementations, determining, for each of the plurality of pairs of model parameters of the machine learning model, the respective covariance between: (i) the first model parameter of the pair of model parameters, and (ii) the second model parameter of the pair of model parameters, comprises: determining, for each of the plurality of pairs of model parameters of the machine learning model, a respective second derivative of an objective function with respect to the pair of model parameters, wherein the machine learning model has been trained to optimize the objective function; and processing the second derivatives of the objective function with respect to the pairs of model parameters to generate the covariances of the pairs of model parameters.

In some implementations, for each pair of model inputs in the candidate batch of model inputs, determining the covariance for the pair of model inputs comprises: determining a quality measure of a first model input in the pair of model inputs based on a value of a predicted label for the first model input relative to values of predicted labels for each other model input in the candidate batch of model inputs; determining a quality measure of a second model input in the pair of model inputs based on a value of a predicted label for the second model input relative to values of predicted labels for each other model input in the candidate batch of model inputs; and modifying the covariance for the pair of model inputs based on: (i) the quality measure of the first model input, and (ii) the quality measure of the second model input.

In some implementations, the quality measure of the first model input is based on a quantile of the value of the predicted label for the first model input in a set of values that comprises a respective value of a predicted label for each model input in the candidate batch of model inputs.

In some implementations, the quality measure of the second model input is based on a quantile of the value of the predicted label for the second model input in a set of values that comprises a respective value of a predicted label for each model input in the candidate batch of model inputs.

In some implementations, wherein modifying the covariance for the pair of model inputs comprises scaling the covariance for the pair of model inputs by the quality measure of the first model input and the quality measure of the second model input.

In some implementations, the method further comprises, at each of a plurality of training iterations in the sequence of training iterations: after training the machine learning model on the current batch of model inputs, providing the machine learning model for further training at a next training iteration in the sequence of training iterations.

In some implementations, the machine learning model is a neural network.

In some implementations, the neural network comprises one or more message passing neural network layers.

In some implementations, at each of the plurality of training iterations, training the machine learning model on at least the current batch of model inputs using the target labels for the current batch of model inputs comprises, for each model input in the current batch of model inputs: training the machine learning model to process the model input to generate a predicted label that matches the target label for the model input.

In some implementations, training the machine learning model to process the model input to generate a predicted label that matches the target label for the model input comprises training the machine learning model to optimize an objective function that measures an error between: (i) the predicted label generated by the machine learning model for the model input, and (ii) the target label for the model input.

In some implementations, generating a set of candidate batches of model inputs comprises: generating a pool of model inputs; determining a respective uncertainty score for each model input in the pool of model inputs, wherein the uncertainty score for a model input characterizes an uncertainty of the machine learning model in generating a predicted label for the model input; determining a probability distribution over the pool of model inputs using the uncertainty scores for the model inputs; and generating the set of candidate batches of model inputs using the probability distribution over the pool of model inputs.

In some implementations, generating the set of candidate batches of model inputs using the probability distribution over the pool of model inputs comprises, for each candidate batch of model inputs: sampling each model input included in the candidate batch of model inputs, from the pool of model inputs, in accordance with the probability distribution over the pool of model inputs.

In some implementations, generating the pool of model inputs comprises generating each model input in the pool of model inputs using a generative machine learning model.

In some implementations, outputting the trained machine learning model comprises: storing the trained machine learning model in a memory.

In some implementations, outputting the trained machine learning model comprises: generating a plurality of model inputs; and processing each of the plurality of model inputs using the trained machine learning model to generate a predicted label for the model input.

In some implementations, at each of a plurality of training iterations, each model input in the current batch of model inputs corresponds to a respective physical entity, and the target label for each model input is generated by operations comprising: physically generating one or more instances of the physical entity corresponding to the model input; and determining one or more properties of the instances of the physical entity; and determining the target label for the model input based on the properties of the instances of the physical entity.

In some implementations, the machine learning model is configured to process a model input to generate a predicted label for the model input.

In some implementations, the predicted label for the model input comprises a numerical value.

In some implementations, the model input corresponds to a molecule, and the predicted label for the model input defines a predicted property of the molecule.

In some implementations, the model input comprises data defining a graph representing a three-dimensional geometric structure of the molecule.

In some implementations, the predicted property of the molecule characterizes an absorption of the molecule, or a distribution of the molecule, or a metabolism of the molecule, or an excretion of the molecule, or a toxicity of the molecule.

In some implementations, outputting the trained machine learning model comprises: selecting one or more molecules using the machine learning model; and physically synthesizing the one or more molecules.

In some implementations, the model input corresponds to a sequence of messenger ribonucleic acid (mRNA) nucleotides and the predicted label for the model input characterizes a protein generated from the sequence of mRNA nucleotides.

In some implementations, the predicted label for the model input characterizes a stability of the protein generated from the sequence of mRNA nucleotides.

In some implementations, the predicted label for the model input characterizes an efficiency of translating of the sequence of mRNA nucleotides to the generate the protein.

In some implementations, outputting the trained machine learning model comprises selecting one or more sequences of mRNA nucleotides using the machine learning model; and physically synthesizing the one or more sequences of mRNA nucleotides.

In some implementations, the model input corresponds to a lipid nanoparticle, and the predicted label for the model input characterizes a performance of the lipid nanoparticle in transporting a drug to a target.

In some implementations, outputting the trained machine learning model comprises selecting one or more lipid nanoparticles using the machine learning model; and physically synthesizing the one or more lipid nanoparticles.

In some implementations, the model input corresponds to an amino acid sequence of a monomer of a capsid protein, and the predicted label for the model input characterizes a predicted quality of the capsid protein.

In some implementations, the predicted quality of the capsid protein characterizes a manufacturability of the capsid protein, or a capacity of viruses that include the capsid protein to avoid neutralization, or an immunoreactivity of the capsid protein, or a capacity of viruses that include the capsid protein to penetrate a target tissue, or a packing capacity of the capsid protein, or a capacity of the capsid protein to integrate into host genomes.

In some implementations, outputting the trained machine learning model comprises selecting one or more amino acid sequences of monomers of capsid proteins; and physically synthesizing the one or more amino acid sequences of monomers of capsid proteins.

In some implementations, for each candidate batch of model inputs, generating the score for the candidate batch of model inputs comprises: obtaining, for each model input in the candidate batch of model inputs, a set of classifications of the model input that includes a respective classification generated for the model input by each machine learning model in an ensemble of machine learning models; and processing the sets of classifications of the model inputs in the candidate batch of model inputs to generate the score for the candidate batch of model inputs as an approximation of an entropy of the candidate batch of model inputs.

In some implementations, processing the sets of classifications of the model inputs in the candidate batch of model inputs to generate the score for the candidate batch of model inputs as an approximation of an entropy of the candidate batch of model inputs comprises: processing the sets of classifications of the model inputs in the candidate batch of model inputs to generate, for each n-tuple of model inputs from the candidate batch of model inputs, a respective probability distribution over a space of possible joint classifications of model inputs in the n-tuple of model inputs; and processing the probability distributions for the n-tuples of model inputs in the candidate batch of model inputs to generate the score for the candidate batch of model inputs.

In some implementations, each n-tuple of model inputs is a two-tuple of model inputs comprising a first model input and a second model input from the candidate batch of model inputs.

In some implementations, processing the probability distributions for the n-tuples of model inputs in the candidate batch of model inputs to generate the score for the candidate batch of model inputs comprises: generating, for each n-tuple of model inputs from the candidate batch of model inputs, a respective joint entropy of the model inputs in the n-tuple of model inputs based on the probability distribution over the space of joint classifications of model inputs in the n-tuple of model inputs; and generating the score for the candidate batch of model inputs by combining the joint entropies of the model inputs in the n-tuples of model inputs from the candidate batch of model inputs.

In some implementations, generating the score for the candidate batch of model inputs by combining the joint entropies of the model inputs in the n-tuples of model inputs from the candidate batch of model inputs comprises summing the joint entropies of the model inputs in the n-tuples of model inputs from the candidate batch of model inputs.

In another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

In another aspect, there are provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

The system described in this specification can train a machine learning model, over a sequence of training iterations, to perform a machine learning task. At each training iteration, the system selects a new batch of model inputs and obtains a respective target label for each model input in the current batch of model inputs. A label for a model input defines a model output that should be generated by the machine learning model by processing the model input. The system can then train the machine learning model on all inputs from all batches that have been labeled using the target labels for the model inputs.

The system implements a policy for selecting the current batch of model inputs at each training iteration in order to increase the prediction accuracy of the machine learning model, reduce the number of training iterations required for training the machine learning model, and reduce the overall number of inputs for which a label is needed. Reducing the number of training iterations required for training the machine learning model can enable more efficient use of resources. For instance, training the machine learning model at each training iteration requires computational resources (e.g., memory and computing power), and therefore reducing the number of training iterations can reduce consumption of computational resources during training. Further, obtaining target labels for model inputs at each training iteration can be time consuming and expensive, e.g., in cases where generating a target label for a model input can require performing a physical experiment. In some cases, a model input can represent a physical entity (e.g., a molecule, or a sequence of messenger ribonucleic acid (mRNA) nucleotides, or a lipid nanoparticle, or an amino acid sequence of a monomer of a capsid protein), and determining a target label for a model input can require synthesizing and testing one or more instances of the physical entity. Therefore reducing the number of training iterations required for training the machine learning model can reduce consumption of resources required for obtaining target labels for model inputs.

To select the current batch of model inputs for training the machine learning model at a training iteration, the system generates a set of candidate batches of model inputs and determines a score for each candidate batch of model inputs. The score for a candidate batch of model inputs characterizes both: (i) the uncertainty of the machine learning model in generating predicted labels for the model inputs in the candidate batch of model inputs, and (ii) the diversity of the model inputs in the candidate batch of model inputs. The system uses the scores to select the current batch of model inputs from among the set of candidate batches of model inputs, e.g., by selecting the candidate batch of model inputs having the highest score. The search for top scoring batches is performed by generating a collection of batches each containing a set of model inputs. Model inputs for batches are sampled according to their weight which is based on the uncertainty assigned to their label. The system then generates a score for each batch and selects the highest scoring batch for labeling.

Training the machine learning model on model inputs (features) associated with a high level of uncertainty can rapidly increase the prediction accuracy of the machine learning model. However, selecting model inputs for inclusion in a batch of model inputs based only on prediction uncertainties associated with individual model inputs can result in a homogenous batch of model inputs, i.e., having many similar or nearly identical model inputs. Training the machine learning model on a homogeneous batch of model inputs may be less effective than training the machine learning model on a diverse batch of model inputs and may completely miss very high scoring inputs that were never included in any batch. To address this, she system implements a policy for selecting a batch of model inputs at each training iteration that accounts for both the prediction uncertainty associated with individual model inputs and for the diversity of the batch of model inputs as a whole.

In particular, the system can generate a score for a candidate batch of model inputs by generating a covariance matrix that represents covariances between predicted labels associated with respective pairs of model inputs in the candidate batch of model inputs. The system can use a variety of methods for generating such covariances, e.g., based on stochastic dropout or on Laplace approximation. The system can apply a transformation operation, e.g., a determinant operation, to the covariance matrix to generate a score for the batch of model inputs that characterizes both the prediction uncertainty and the diversity of the batch of model inputs.

Further, in implementations where the machine learning model is configured to perform a classification task, the system can generate a score for a batch of model inputs by determining joint entropies of n-tuples of model inputs from the batch of model inputs (where n can be, for instance, two, or any appropriate integer value greater than two). The system can then combine the entropies of the n-tuples of model inputs from the batch of model inputs to generate a score that approximates the entropy of the batch of model inputs, and thus characterizes both the prediction uncertainty and the diversity of the batch of model inputs.

Scoring candidate batches of model inputs in this manner defines a policy for selecting batches of model inputs that can increase the prediction accuracy of the machine learning model and reduce the number of training iterations required for training the machine learning model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9 shows a table of results that compares the performance of the various implementations of the training system described in this specification to alternative training systems.

Like reference numbers and designations in the various drawings indicate like elements.

DETAILED DESCRIPTION

Figure 1:
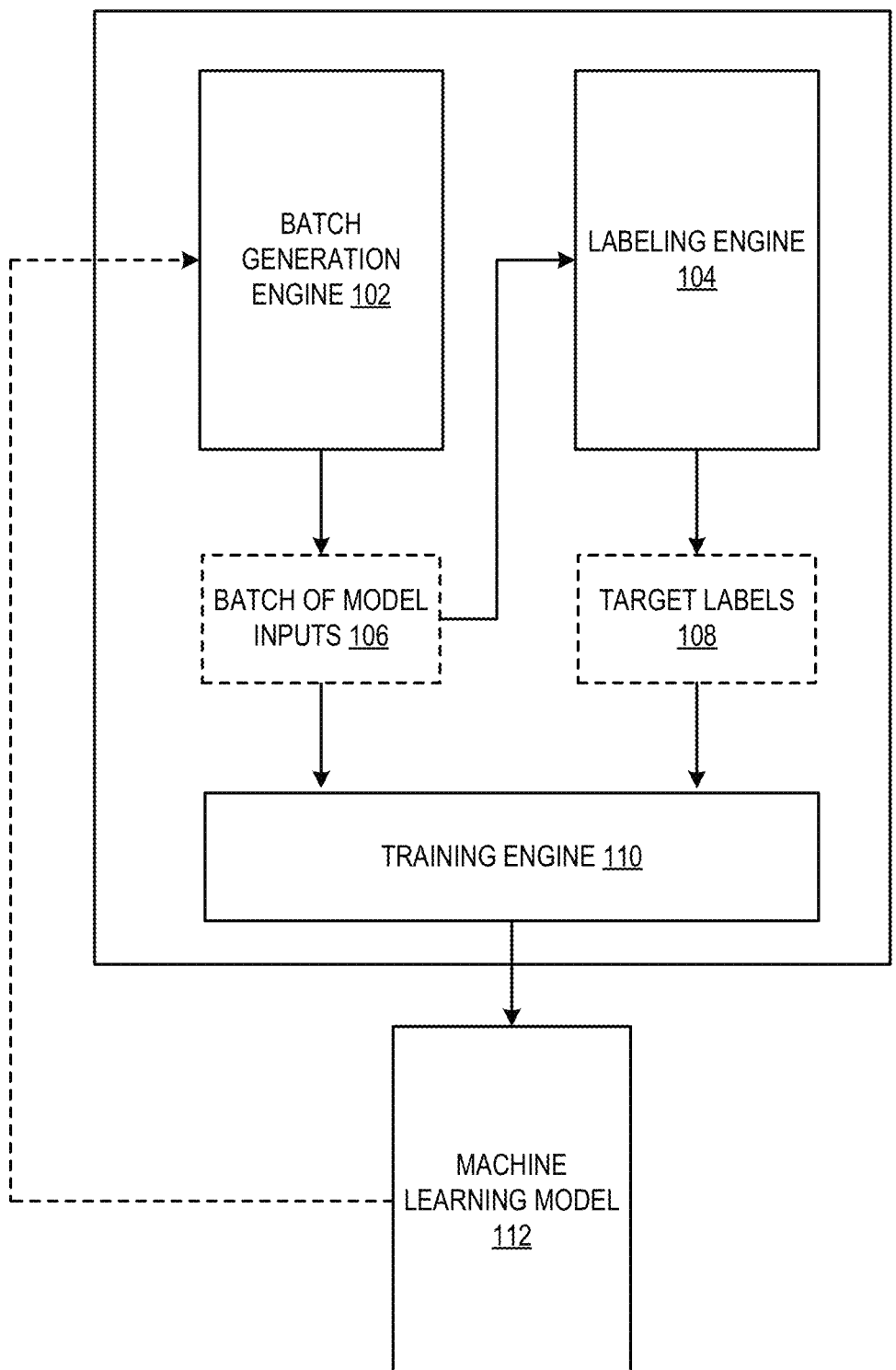
FIG. 1 shows an example training system.

FIG. 1 shows an example training system 100. The training system 100 is an example of a system implemented as computer programs on one or more computers in one or more locations in which the systems, components, and techniques described below are implemented.

The training system 100 trains a machine learning model 112 over a sequence of training iterations to perform a machine learning task, in particular, to process a model input in accordance with values of a set of machine learning model parameters to generate a predicted label for the model input.

The training system 100 can train the machine learning model 112 to perform any appropriate machine learning task. A few examples of possible machine learning tasks are described next.

In some implementations, the machine learning model 112 can be configured to process a model input that includes data characterizing a molecule to generate a predicted label that defines one or more predicted properties of the molecule. For instance, the predicted label can characterize one or more of: the absorption of the molecule in a subject, the distribution of a set of molecules in a subject, metabolism of the set of molecules in a subject, excretion of the molecule in a subject, or toxicity of the molecule in a subject.

In some implementations, the machine learning model 112 can be configured to process a model input characterizing a sequence of messenger ribonucleic acid (mRNA) nucleotides to generate a predicted label that characterizes a protein generated from the sequence of mRNA nucleotides. For instance, the predicted label can characterize a predicted stability of the protein generated from the sequence of mRNA nucleotides, or an efficiency of translating the sequence of mRNA nucleotides to generate the corresponding protein.

In some implementations, the machine learning model 112 can be configured to process a model input characterizing a sequence of non-coding ribonucleic acid (ncRNA) nucleotides to generate a predicted label for the ncRNA sequence. For instance, the predicted label can classify the ncRNA sequence into a set of possible types of ncRNA, e.g., miRNA, srRNA, lncRNA, and so forth. As another example, the predicted label can classify whether the ncRNA sequence is associated with a particular disease (e.g., cancer). As another example, the predicted label can characterize a predicted expression level of the ncRNA sequence under different conditions or in different tissues.

In some implementations, the machine learning model 112 can be configured to process a model input that characterizes a lipid nanoparticle to generate a predicted label that characterizes a performance of the lipid nanoparticle in transporting a drug to a target. More specifically, the predicted label can characterize, e.g., a proportion of a drug that is administered to a subject by way of the lipid nanoparticle that reaches the target in the subject. The target can be, e.g., a target organ in the subject, e.g., the liver, or the brain, or the kidneys.

In some implementations, the machine learning model 112 can be configured to process a model input that characterizes an amino acid sequence of a monomer of a capsid protein to generate a predicted label that characterizes a predicted quality of the capsid protein. More specifically, the predicted label can characterize, e.g., a manufacturability of the capsid protein, or a capacity of viruses that include the capsid protein to avoid neutralization, or an immunoreactivity of the capsid protein, or a capacity of viruses that include the capsid protein to penetrate a target tissue, or a packing capacity of the capsid protein, or a capacity of the capsid protein to integrate into host genomes.

A model input to the machine learning model can be represented in any appropriate way. For instance, a model input to the machine learning model can include graph data representing a graph characterizing a set of one or more molecules. The graph can include a set of nodes and a set of edges, where each edge in the graph connects a respective pair of nodes in the graph. For instance, each node in the graph can represent a respective atom in the set of molecules, and each edge in the graph can represent a relationship between a corresponding pair of atoms in the set of molecules. For instance, an edge can represent that the corresponding pair of atoms are separated by less than a predefined threshold distance, or that a bond exists between the corresponding pair of atoms. Each node and each edge in the graph can be associated with a corresponding set of features, e.g., each node can be associated with features that define a three-dimensional (3D) spatial position of an atom represented by the node, such that the graph characterizes a 3D geometric structure of the set of molecules. As another example, the model input to the machine learning model can include a string-based representation of a set of one or more molecules. The string-based representation can be, e.g., a simplified molecular-input line-entry system (SMILES) string.

The machine learning model can be any appropriate type of machine learning model and can have any appropriate machine learning model architecture. For instance, the machine learning model can include one or more of: a neural network, or a decision tree, or a random forest, or a support vector machine. In implementations where the machine learning model includes one or more neural networks, each of the neural networks can include any appropriate types of neural network layers (e.g., fully connected layers, message passing layers, convolutional layers, attention layers, and so forth) in any appropriate number (e.g., 5 layers, or 10 layers, or 100 layers) and connected in any appropriate configuration (e.g., as a directed graph of layers). A particular example implementation of the machine learning model as a neural network is described in more detail below with reference to FIG. 6.

The training system 100 includes a batch generation engine 102, a labeling engine 104, and a training engine 110, which are each described in more detail next.

The batch generation engine 102 is configured to select, at each training iteration in the sequence of training iterations, a respective current batch of model inputs for training the machine learning model at the training iteration. The batch generation engine 102 implements a policy for selecting the current batch of model inputs that accounts for both the prediction uncertainty associated with individual model inputs and for the diversity of the current batch of model inputs as a whole.

More specifically, as part of selecting the current batch of model inputs, the batch generation engine 102 evaluates a set of "candidate" batches of model inputs. For each candidate batch of model inputs, the system determines a score for the candidate batch of model inputs that characterizes both: (i) an uncertainty of the machine learning model 112 in generating predicted labels for the model inputs in the candidate batch of model inputs, and (ii) a diversity of the model inputs in the candidate batch of model inputs. The batch generation engine 102 can then select the current batch of model inputs from the set of candidate batches of model inputs based on the scores, e.g., by selecting a candidate batch of model inputs associated with the highest score as the current batch of model inputs.

The system can generate a score for a candidate batch of model inputs that jointly characterizes the prediction uncertainty and the diversity of the model inputs in the batch in any of a variety of possible ways. Example techniques for scoring candidate batches of model inputs are described in more detail below with reference to FIG. 4A-4B.

The labeling engine 104 is configured to obtain, at each training iteration in the sequence of training iterations, a respective target label 108 for each model input in the current batch of model inputs. A target label 108 for a model input defines a model output that should be generated by the machine learning model 112 by processing the model input.

The labeling engine 104 can obtain the target labels 108 for the model inputs in the current batch of model inputs 106 in any of a variety of possible ways. A few example techniques for obtaining target labels 108 for model inputs are described next.

For instance, the labeling engine 104 can provide instructions, e.g., by way of a user interface or an application programming interface (API) made available by the system 100, that one or more physical experiments should be performed to obtain the target labels 108. In some cases, the model inputs can represent physical entities (e.g., molecules, or sequences of messenger ribonucleic acid (mRNA) nucleotides, or lipid nanoparticles, or amino acid sequences of monomers of capsid proteins), and determining a target label for a model input can require physically synthesizing and testing properties of one or more instances of the physical entity. The labeling engine 104 can receive the results of the experiments, e.g., by way of the user interface or the API, and can associate each model input in the current batch 106 with a respective target label based on the results of the experiments.

As another example, the labeling engine 104 can perform numerical simulations in order to obtain the target labels 108 for the current batch of model inputs 106. The numerical simulations can include, e.g., molecular dynamics (MD) simulations, or quantum mechanics/molecular mechanics (QM/MM) simulations, or density functional theory (DFT) simulations, and so forth.

The training engine 110 is configured to, at each training iteration, train the machine learning model 112 on at least the current batch of model inputs 106 using the target labels 108 for the current batch of model inputs 106. Optionally, the training engine 110 can also train the machine learning model 112 on model inputs and target labels obtained at any previous training iterations.

Training the machine learning model 112 on a model input can include training the machine learning model 112 to reduce a discrepancy between: (i) a predicted label generated by the machine learning model 112 for the model input, and (ii) the target label 108 for the model input. More specifically, the training engine 110 can train the machine learning model 112 to optimize (e.g., minimize) an objective function that measures an error between: (i) the predicted label for the model input, and (ii) the target label for the model input. The objective function can measure the error between a predicted label and a target label, e.g., by a cross-entropy loss, or a squared-error loss, or a hinge loss, or a Huber loss, or in any other appropriate way.

The training engine 110 can train the machine learning model 112 using any appropriate machine learning training technique. For instance, for a machine learning model 112 implemented as a neural network, the training engine 110 can train the neural network on a model input by processing by the model input to generate a predicted label, evaluating the objective function on the predicted label, determining gradients of the objective function with respect to a set of neural network parameters of the neural network, and adjusting the current values of the set of neural network parameters using the gradients. The training engine 110 can determine the gradients of the objective function, e.g., using backpropagation, and can adjust the current values of the neural network parameters based on the gradients using the update rule of an appropriate gradient descent optimization technique, e.g., RMSprop or Adam.

After training the machine learning model 112, the training system 100 can output the trained machine learning model 112, e.g., by storing data defining the trained machine learning model 112 in a memory, or by transmitting data defining the trained machine learning model 112 over a data communications network. The trained machine learning model 112 can be defined by data specifying the architecture of the machine learning model 112 and the trained values of the set of model parameters of the machine learning model.

A downstream system can use the trained machine learning model in any of a variety of possible ways. A few example applications of the trained machine learning model are described next.

In some implementations, the machine learning model is configured to process a model input that characterizes a molecule to generate a predicted label that defines a predicted property of the molecule. In these implementations, a downstream system can use the trained machine learning model to select one or more molecules for physical synthesis. For instance, the downstream system can use the trained machine learning model to generate a respective predicted label for each molecule in a set of candidate molecules. The downstream system can rank the candidate molecules based on the predicted labels, and can then select one or more molecules for physical synthesis based on the ranking, e.g., by selecting one or more highest-ranked molecules for physical synthesis. The selected molecules can then be physically synthesized.

In some implementations, the machine learning model is configured to process a model input that characterizes a sequence of mRNA nucleotides to generate a predicted label that characterizes a property (e.g., a stability or a translation efficiency) of a protein generated from the sequence of mRNA nucleotides. In these implementations, the downstream system can use the trained machine learning model to select one or more sequences of mRNA nucleotides for physical synthesis. For instance, the downstream system can use the trained machine learning model to generate a respective predicted label for each mRNA nucleotide sequence in a set of candidate mRNA nucleotide sequences. The downstream system can rank the candidate mRNA nucleotide sequences based on the predicted labels, and can select one or more highest-ranked mRNA nucleotide sequences for physical synthesis. The selected mRNA nucleotides sequences can then be physically synthesized.

In some implementations, the machine learning model is configured to process a model input that characterizes a lipid nanoparticle to generate a predicted label that characterizes a performance of the lipid nanoparticle in transporting a drug to a target. In these implementations, the downstream system can use the trained machine learning model to select one or more lipid nanoparticles for physical synthesis. For instance, the downstream system can use the trained machine learning model to generate a respective predicted label for each lipid nanoparticle in a set of candidate lipid nanoparticles. The downstream system can rank the candidate lipid nanoparticles based on the predicted labels, and can select one or more highest-ranked lipid nanoparticles for physical synthesis. The selected lipid nanoparticles can then be physically synthesized.

In some implementations, the machine learning model is configured to process a model input that characterizes an amino acid sequence of a monomer of a capsid protein to generate a predicted label that characterizes a predicted quality of the capsid protein (as described above). In these implementations, the downstream system can use the trained machine learning model to select one or more amino acid sequences of monomers of capsid proteins for synthesis. For instance, the downstream analysis system can use the trained machine learning model to generate a predicted label for each amino acid sequence in a set of candidate amino acid sequences. The downstream analysis system can rank the candidate amino acid sequences based on the predicted labels, and can select one or more highest-ranked amino acid sequences for physical synthesis. The selected amino acid sequences can then be physically synthesized, and optionally, aggregated to form capsid proteins.

In some implementations, the machine learning model is configured to perform a classification task, i.e., to process a model input to generate a classification of the model input that assigns the model input to a respective class from a finite set of possible classes. The finite set of possible classes can include any appropriate number of classes, e.g., 2 classes, or 5 classes, or 10 classes. A few examples of possible classification tasks are described next.

In one example, the machine learning model is configured to process a model input characterizing a molecule to generate a classification of the molecule that defines whether the molecule binds to a particular protein target.

In another example, the machine learning model is configured to process a model input characterizing a molecule to generate a classification of the molecule that defines whether the molecule penetrates the blood-brain barrier.

In another example, the machine learning model is configured to process a model input characterizing a molecule to generate a classification of the molecule that defines whether the molecule has at least a threshold level of toxicity (e.g., that would cause the molecule to fail a clinical trial).

In another example, the machine learning model is configured to process a model input characterizing a molecule to generate a classification of the molecule that defines whether the molecule blocks a particular gene.

In another example, the machine learning model is configured to process a model input characterizing a molecule to generate a classification of the molecule that defines whether the molecule treats a particular disease, e.g., Acquired Immunodeficiency Syndrome (AIDS) or SARS-COV-2.

In another example, the machine learning model is configured to process a model input characterizing a molecule to generate a classification of the molecule that defines whether the molecule triggers an immune reaction when administered to a subject in a drug.

Figure 2:
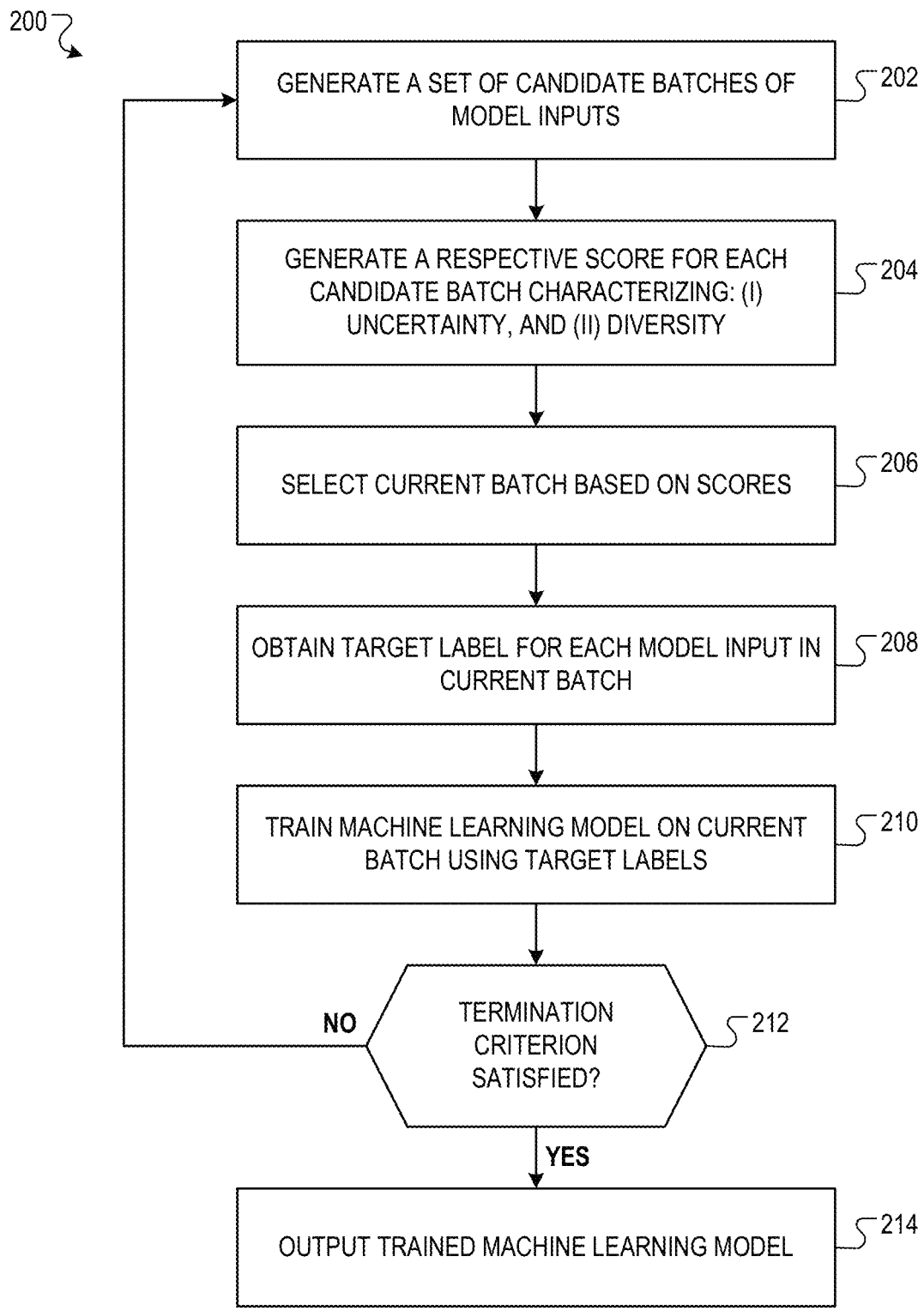
FIG. 2 is a flow diagram of an example process for training a machine learning model using a batch selection policy.

FIG. 2 is a flow diagram of an example process 200 for training a machine learning model using a batch selection policy. For convenience, the process 200 will be described as being performed by a system of one or more computers located in one or more locations. For example, a training system, e.g., the training system 100 of FIG. 1, appropriately programmed in accordance with this specification, can perform the process 200.

Steps 202-212 of the process 200 are performed at each training iteration in a sequence of one or more training iterations. For convenience, the description which follows will reference a "current" training iteration in the sequence of training iterations.

The system generates a set of candidate batches of model inputs to the machine learning model (202). The system can generate any appropriate number of candidate batches, e.g., 10 candidate batches, or 1000 candidate batches, or 1,000,000 candidate batches. Each candidate batch can include any appropriate number of model inputs, e.g., 10 model inputs, or 50 model inputs, or 100 model inputs. An example process for generating a set of candidate batches of model inputs is described in detail with reference to FIG. 3.

The system generates a respective score for each candidate batch of model inputs (204). The score for a candidate batch of model inputs characterizes: (i) an uncertainty of the machine learning model in generating predicted labels for the model inputs in the candidate batch of model inputs, and (ii) a diversity of the model inputs in the candidate batch of model inputs. Example processes for generating a score characterizing a prediction uncertainty and a diversity of a candidate batch of model inputs is described in detail with reference to FIG. 4A-4B.

The system selects a current batch of model inputs for training the machine learning model at the current training iteration based on the scores of the candidate batches of model inputs (206). For instance, the system can select the candidate batch of model inputs that is associated with the highest score from among the set of candidate batches of model inputs. Optionally, as part of selecting the current batch of model inputs, the system can select one or more of the candidate batches of model inputs (e.g., that are associated with the highest scores), and then optimize the batch element-wise, e.g., changing the first model input in the batch to optimize the score associated with the batch, and then changing the second model input in the batch to optimize the score associated with the batch, and so forth, doing several passes until each batch reaches equilibrium. The system can then select the batch of model inputs associated with the highest score as the current batch of model inputs for training the machine learning model at the current training iteration.

The system obtains a respective target label for each model input in the current batch of model inputs (208). The target label for a model input defines a model output that should be generated by the machine learning model by processing the model input. A target label for a model input can be generated, e.g., by physically synthesizing one or more instances of an entity (e.g., a molecule) corresponding to the model input, determining one or more properties of the physically synthesized instances of the entity, and determining the target label for the model input based on the properties. As another example, the system can determine a target label for a model input by performing one or more numerical simulations (as described above with reference to FIG. 1).

The system trains the machine learning model on at least the current batch of model inputs using the target labels for the current batch of model inputs (210). Optionally, the system can train the machine learning model on: (i) the current batch of model inputs, and (ii) batches of model inputs selected at any of the preceding training iterations.

The system determines whether a termination criterion for terminating the training of the machine learning model has been satisfied (212). The system can determine that a termination criterion has been satisfied, e.g., if a predefined number of training iterations have been performed, or if a performance (e.g., prediction accuracy) of the machine learning model exceeds a threshold when evaluated on a set of validation data.

In response to determining that the termination criterion has been satisfied, the system outputs the trained machine learning model (214).

In response to determining that the termination criterion has not been satisfied, the system returns to step (202) and proceeds to the next training iteration.

Figure 3:
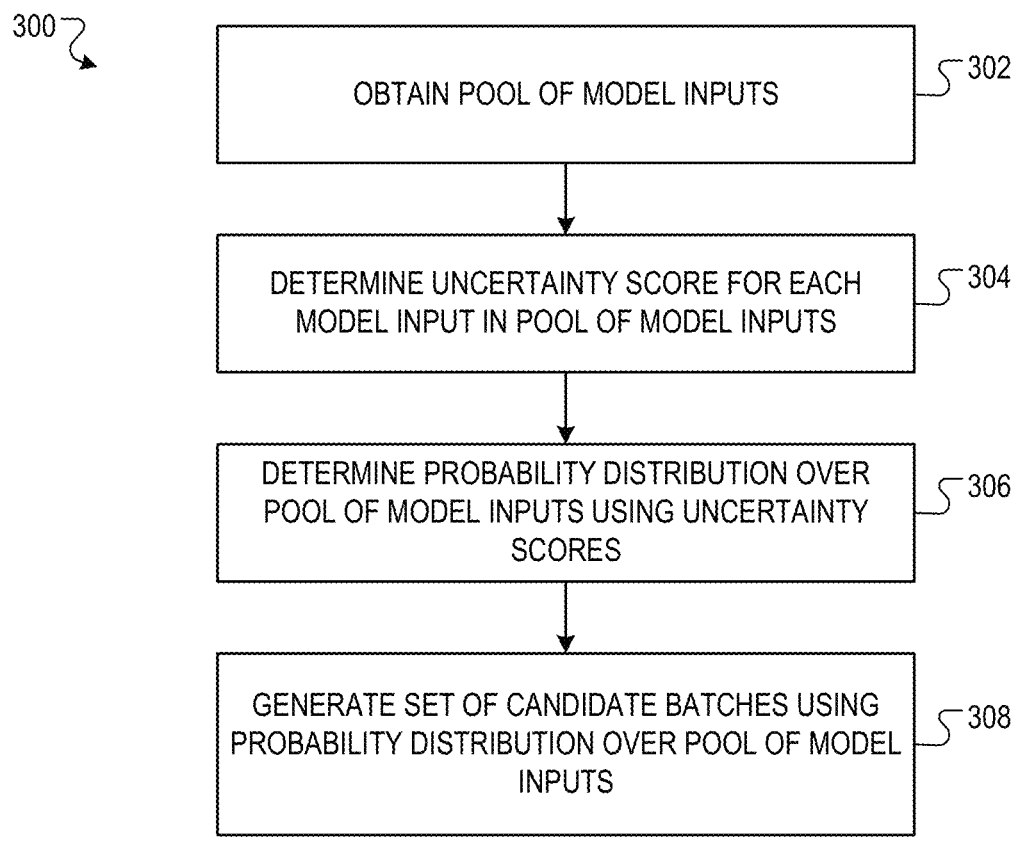
FIG. 3 is a flow diagram of an example process for generating a set of candidate batches of model inputs.

FIG. 3 is a flow diagram of an example process 300 for generating a set of candidate batches of model inputs. For convenience, the process 300 will be described as being performed by a system of one or more computers located in one or more locations. For example, a training system, e.g., the training system 100 of FIG. 1, appropriately programmed in accordance with this specification, can perform the process 300.

The system obtains a pool of model inputs (302). In some cases, the system obtains a predefined pool of model inputs, e.g., in the form of a preexisting database of molecules, or amino acid sequences, or lipid nanoparticles, and so forth. In other cases, the system generates the pool of model inputs using a generative model, e.g., a machine learning model that can be queried to generate samples from a distribution over a space of possible model inputs. The generative model can be, e.g., a diffusion-based neural network model, a generative adversarial neural network, a flow-based model, and so forth.

The system determines a respective uncertainty score for each model input in the pool of model inputs (304). An uncertainty score for a model input characterizes an uncertainty of the machine learning model in generating a predicted label for the model input. Example process for generating uncertainty scores for model inputs is described in more detail below with reference to FIG. 4A-4B.

The system determines a probability distribution over the pool of model inputs using the uncertainty scores for the model inputs (306). To generate the probability distribution, the system can generate a quantile distribution over the pool of inputs that assigns a respective quantile value to each model input that defines a quantile of the uncertainty score of the model input. The system can then process the quantile distribution, e.g., by a soft-max function, to generate the probability distribution over the set of model inputs.

The system generates the set of candidate batches of model inputs using the probability distribution over the pool of model inputs (308). For instance, for each candidate batch of model inputs, the system can sample each model input included in the candidate batch of model inputs in accordance with the probability distribution over the pool of model inputs.

Figure 4A:
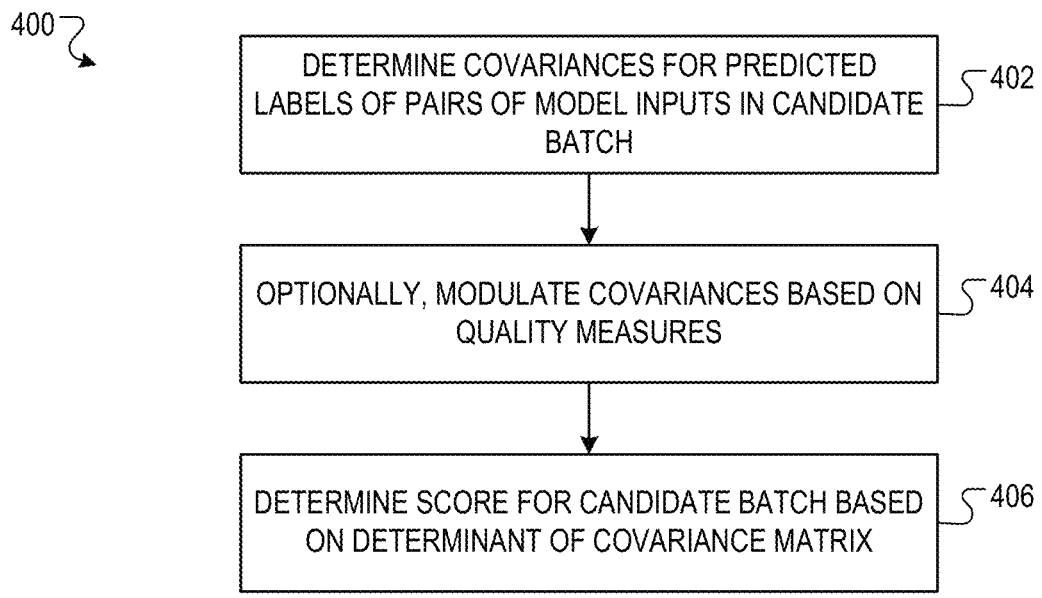
FIG. 4A is a flow diagram of an example process for generating a score for a batch of model inputs, based on a covariance matrix, that characterizes: (i) an uncertainty of the machine learning model in generating predicted labels for the model inputs in the candidate batch of model inputs, and (ii) a diversity of the model inputs in the candidate batch of model inputs.

FIG. 4A is a flow diagram of an example process 400 for generating a score for a batch of model inputs, based on a covariance matrix, that characterizes: (i) an uncertainty of the machine learning model in generating predicted labels for the model inputs in the candidate batch of model inputs, and (ii) a diversity of the model inputs in the candidate batch of model inputs. For convenience, the process 400 will be described as being performed by a system of one or more computers located in one or more locations. For example, a training system, e.g., the training system 100 of FIG. 1, appropriately programmed in accordance with this specification, can perform the process 400.

The system determines, for each pair of model inputs included in the batch of model inputs, a respective covariance between: (i) a predicted label for a first model input in the pair of model inputs, and (ii) a predicted label for a second model input in the pair of model inputs (402). In particular, the predicted label of a model input is associated with a distribution over a space of possible values of the predicted label, e.g., as a result of uncertainty in the parameter values of the machine learning model. (The uncertainty in the parameter values of the machine learning model can arise, e.g., because the current parameter values of the machine learning model define an uncertain estimate for "target" parameter values of the machine learning model that would globally optimize an objective function). Thus the predicted label of a model input defines a random variable over the space of possible values of the predicted label. The "covariance" between the predicted labels of a pair of model inputs thus refers to a covariance between a pair of random variables corresponding to the pair of model inputs. The covariances for the pairs of model inputs in the batch can be represented as a covariance matrix, e.g., where entry (i,j) of the covariance matrix defines the covariance for model input i and model input j in the candidate batch of model inputs.

The covariance matrix characterizes both the predictive uncertainty and the diversity of the model inputs in the batch of model inputs. In particular, the covariance between the predicted labels of a pair of identical model inputs defines the variance in the predicted label of the model input. The variance in the predicted label of a model input characterizes the spread or dispersion of the distribution of the values of the predicted label of the model input, and thus defines an uncertainty (e.g., an uncertainty score) of the machine learning model in generating the predicted label for the model input. The covariance between the predicted labels of a pair of different model inputs measures an amount of correlation between the predicted labels of the pair of model inputs, and thus the collection of covariances between pairs of different model inputs collectively characterize the diversity of the model inputs in the batch.

The system can generate the covariance matrix in any of a variety of possible ways. An example process for generating the covariance matrix using an ensemble of machine learning models is described in detail with reference to FIG. 5. An example process for generating the covariance matrix based on covariances between pairs of model parameters of the machine learning model is described in detail with reference to FIG. 6. The particular choice of process used for generating the covariance matrix may depend on the machine learning task under consideration and may be driven, e.g., based on empirical comparisons of performance, available computing power and memory resources, and so forth.

Optionally, for each pair of model inputs in the batch, the system can modulate (modify) the covariance for the pair of model inputs based on: (i) a quality measure of a first model input in the pair, and (ii) a quality measure of a second model input in the pair (404). The "quality measure" of a model input can characterizes the value of a predicted label for the model input relative to the values of the predicted labels of the other model inputs in the batch. For instance, the quality measure of a model input can be based on a quantile of the value of the predicted label of the model input (i.e., in a set of values that includes the value of the predicted label of each model input in the batch). In some implementations, the system modulates the covariance for each pair of model inputs by multiplying the covariance for the pair of model inputs by: (i) the quality measure of the first model input in the pair, and (ii) the quality measure of the second model input in the pair.

Figure 10:
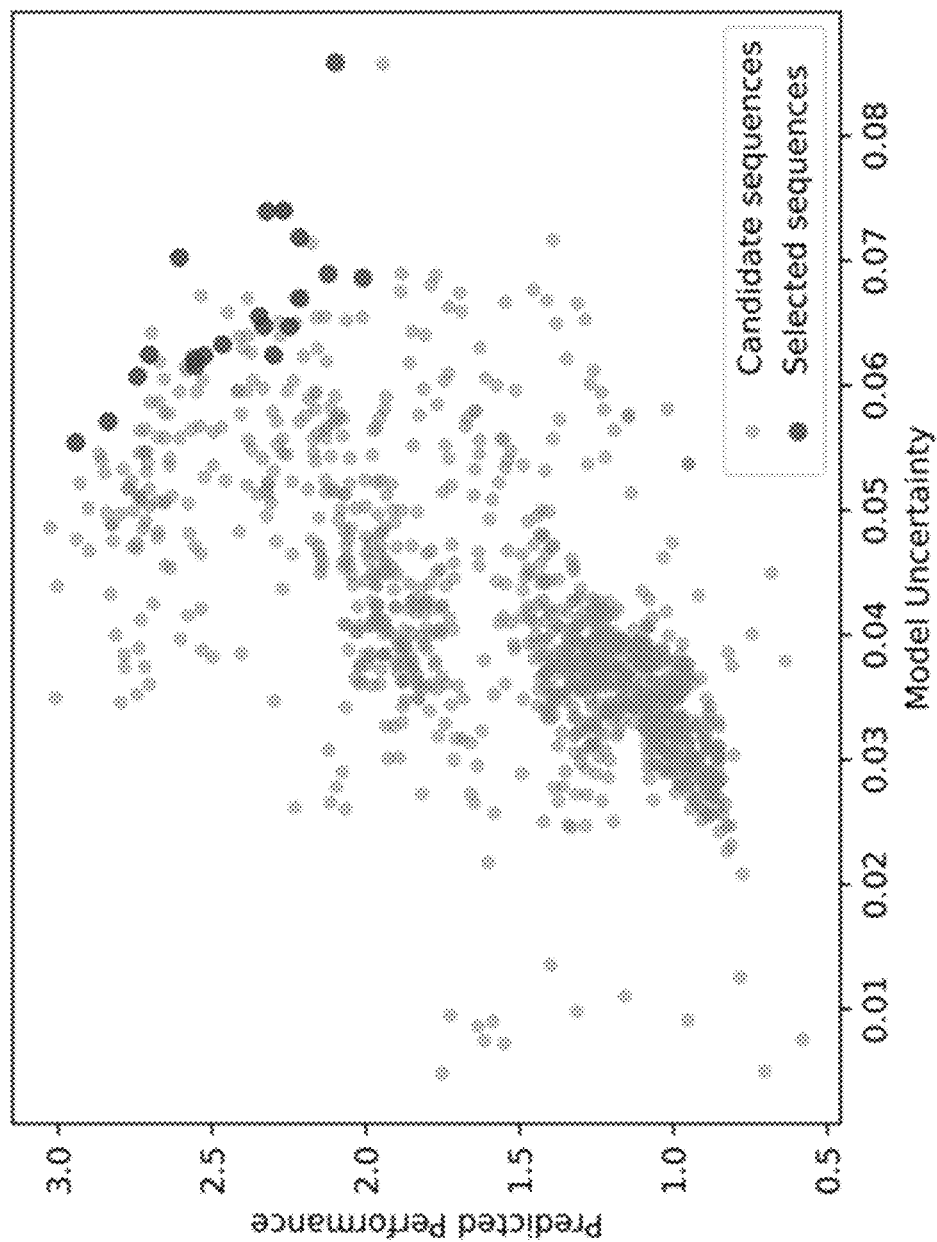
FIG. 10 illustrates an example of selecting a batch of model inputs for training a machine learning model from among a pool of candidate model inputs.

Intuitively, modulating the covariances based on the quality measures of the model inputs encourages the selection of batches with model inputs having higher performance, e.g., with predicted labels having higher values (where higher in this context is understood in this context as being better). Batches with model inputs having lower performance, e.g., with predicted labels having lower values, are more likely to be selected if the model inputs having lower performance are associated with high prediction uncertainties. A model input associated with a high prediction uncertainty has a chance of being a high performing model input even if the machine learning model currently estimates the performance of the model input as being low. FIG. 10, which will be described in more detail below, provides an illustration of the effects of modulating covariances for pairs of model inputs using quality measures.

The system determines the score for the batch of model inputs based on the determinant of the covariance matrix (406). For instance, the system can determine the score for the batch of model inputs as a logarithm of the determinant of the covariance matrix. The determinant of the covariance matrix defines a single numerical value that summarizes the covariance matrix, and in particular, that characterizes the predictive uncertainty and the diversity of the model inputs in the batch of model inputs.

Figure 4B:
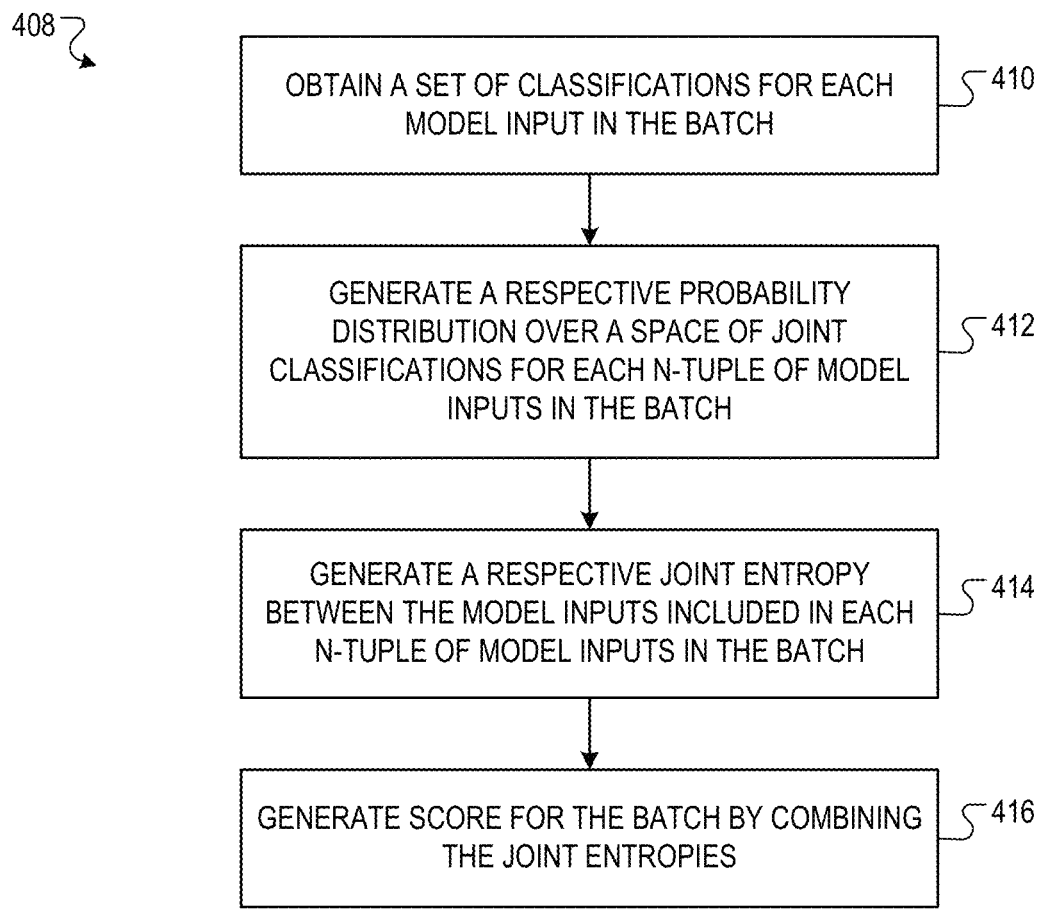
FIG. 4B is a flow diagram of an example process for generating a score for a batch of model inputs, based on an approximation of the entropy (information) in the batch, that characterizes: (i) an uncertainty of the machine learning model in generating predicted labels for the model inputs in the candidate batch of model inputs, and (ii) a diversity of the model inputs in the candidate batch of model inputs.

FIG. 4B is a flow diagram of an example process 408 for generating a score for a batch of model inputs, based on an approximation of the entropy (information) in the batch, that characterizes: (i) an uncertainty of the machine learning model in generating predicted labels for the model inputs in the candidate batch of model inputs, and (ii) a diversity of the model inputs in the candidate batch of model inputs. For convenience, the process 408 will be described as being performed by a system of one or more computers located in one or more locations. For example, a training system, e.g., the training system 100 of FIG. 1, appropriately programmed in accordance with this specification, can perform the process 408.

The ensemble of machine learning models referenced in the description of FIG. 4B can include any appropriate number of machine learning models, e.g., 5 machine learning models, or 10 machine learning models, or 100 machine learning models. Each machine learning model in the ensemble differs from each other machine learning model in the ensemble, e.g., as a result of having different parameter values, or a different architecture, or both. A few example techniques for generating the ensemble of machine learning models are described next.

In some implementations, at each training iteration, the system trains an ensemble of multiple machine learning models, i.e., rather than only a single machine learning model. Each machine learning model in the ensemble can be trained based on a different subset of the training data, or can have differently initialized parameter values, or both, than each other machine learning model in the ensemble.

In some implementations, the machine learning model includes a neural network, and each machine learning model in the ensemble is determined by dropping a respective set of parameters from the neural network. "Dropping" a parameter from the neural network can refer to setting the value of the parameter to a default value, e.g., zero, or to a random value, e.g., a value sampled from a Gaussian distribution. The system can randomly sample the set of parameters to be dropped from the neural network in order to generate each machine learning model in the ensemble. For instance, for each parameter in the neural network and for each machine learning model in the ensemble, the system can determine whether to drop the parameter from the machine learning model based on sampling from a probability distribution, e.g., a Bernoulli distribution.

In the description of FIG. 4B, each machine learning model in the ensemble of machine learning models has been trained to perform a classification task, that is, to process a model input (in accordance with values of a set of machine learning model parameters of the machine learning model) to generate a classification of the model input. The classification of the model input assigns the model input to a respective class from a set of possible classes, where the set of possible classes includes a finite number of classes, e.g., 2 classes, or 5 classes, or 10 classes. Examples of classification tasks are described in more detail above with reference to FIG. 1.

The system obtains, for each model input in the batch of model inputs, a set of classifications of the model input (410). Each classification of a model input is generated by a respective machine learning model in the ensemble of machine learning models, e.g., by processing the model input in accordance with values of the set of model parameters of the machine learning model to generate the classification. Each model input in the batch of model inputs can thus be associated with a number of classifications that is equal to the number of machine learning models in the ensemble of machine learning models.

For at least some (and potentially all) of the model inputs, the set of classifications of the model input includes multiple different classes from the set of possible classes. That is, for at least some of the model inputs, the set of classifications of the model input do not all assign the model input to the same class, but rather include classifications that assign the model input to different classes from the set of possible classes. Variations in the classifications of a model input may result from, e.g., underlying uncertainty in the classification itself (e.g., if the task of classifying the model input has some inherent ambiguity), or uncertainty in the model parameters of the machine learning models in the ensemble of machine learning models, or both.

The system can represent the sets of classifications of the model inputs in the batch of model inputs, e.g., as a N×M classification matrix denoted E, where N is the number of model inputs in the batch of model inputs, M is the number of machine learning models in the ensemble of machine learning models, and $E_i^m$ denotes the entry in row i and column m of the matrix and defines the classification generated for model input i by machine learning model m.

The system processes the classification matrix to generate, for each n-tuple of model inputs from the batch of model inputs (where n∈{2, . . . , N} and N is the number of model inputs in the batch of model inputs), a probability distribution over a space of joint classifications of the model inputs in the n-tuple of model inputs (412). A joint classification of the model inputs in the n-tuple of model inputs assigns a respective class from the set of possible classes to each model input in the n-tuple of model inputs. Thus the space of joint classifications can be an n-fold Cartesian product of the set of possible classes.

For a given n-tuple of model inputs, the probability distribution over the space of joint classifications of the model inputs in the n-tuple of model inputs assigns a respective probability to each possible joint classification of the model inputs in the n-tuple of model inputs. The system can determine the probability of a particular joint classification of the model inputs in the n-tuple of model inputs, e.g., as a ratio of: (i) the number of machine learning models in the ensemble of machine learning models classify each model input in the n-tuple of model inputs as being included in the respective class assigned to the model input by the joint classification, and (ii) the number of machine learning models in the ensemble of machine learning models.

For instance, for each two-tuple of model inputs (i, j), the system can generate a probability distribution $P_{i,j}$ over possible joint classifications of the two-tuple of model inputs as:

$$P_{i,j}(a, b) = \frac{1}{M}\sum_{m=1}^{M}\begin{cases}1 & \text{if } E_i^m = a \text{ and } E_j^m = b \\ 0 & \text{otherwise}\end{cases}$$

where (α, b) is the joint classification of the two-tuple, α, b∈{0, . . . , k−1} where k is the number of classes in the set of possible classes, m indexes the machine learning models in the ensemble of machine learning models, M is the total number of machine learning models in the ensemble of machine learning models, $E_i^m$ is the classification generated by machine learning model m for model input i, and $E_j^m$ is the classification generated by machine learning model m for model input j.

The system determines, for each n-tuple of model inputs, a respective joint entropy between the model inputs included in the n-tuple of model inputs based on the probability distribution over the space of joint classifications of the model inputs in the n-tuple of model inputs (414). For instance, for each two-tuple of model inputs (i, j), the system can generate the joint entropy $H_{i,j}$ of the model inputs i and j as:

$$H_{i,j} = \sum_{a, b \in K} P_{i,j}(a, b) \cdot \log P_{i,j}(a, b)$$

where K={0, . . . , k−1} indexes the classes in the set of possible classes and $P_{i,j}$ is the probability distribution over possible joint classifications of the two-tuple of model inputs (i, j).

The system generates the score for the batch of model inputs that defines an approximation of the entropy of the batch by combining the joint entropies for the n-tuples of model inputs in the batch of model inputs (416). For instance, the system can determine the score for the batch of model inputs by summing (and optionally scaling) the joint entropies for the n-tuples of model inputs in the batch of model inputs, e.g., the system can determine the score a (B) for batch B as:

$$a(B) = \alpha \sum_{(i,j)\in B} H_{i,j}$$

where α is a positive scaling constant, (i, j) is a two-tuple of model inputs, B is the set of two-tuples of model inputs, and $H_{i,j}$ is the joint entropy for the two-tuple of model inputs (i, j). More generally, the system can combine the joint entropies for the n-tuples of model inputs in the batch of mode inputs in any appropriate manner (e.g., in combination with or as an alternative to summing the joint entropies), e.g., using any appropriate manually defined or machine-learned operations.

Generating a score for the batch of model inputs by approximating the entropy of the batch of model inputs can cause the score to characterize both the predictive uncertainty and the diversity of the model inputs in the batch of model inputs. In particular, increasing the predictive uncertainty for model inputs in the batch may increase the entropy of the batch, and increasing the diversity of the model inputs in the batch (e.g., by reducing correlations between the predicted classifications of the model inputs in the batch) may also increase the entropy of the batch. Thus the entropy of the batch can jointly encode and characterize the predictive uncertainty and the diversity of the model inputs in the batch of model inputs. (Note that, for any particular model input, the entropy of the model input can provide an uncertainty score that defines an uncertainty of the ensemble of machine learning models in classifying the model input).

In an implementation where the system generates a probability distribution over possible joint classifications of every model input in the batch of model inputs, then the system can determine a joint entropy between all the model inputs in the batch, and that joint entropy can directly define the score for the batch. That is, in these implementations, the system may omit the step of aggregating the joint entropies, as described above at step 416, because there is only a single joint entropy.

In some cases, the system can generate a more accurate approximation of the entropy of the batch by determining probability distributions and joint entropies with reference to n-tuples of model inputs where n is a small number, e.g., where n is two, or n is three, or n is four. For larger choices of n (and in particular if n is chosen to be equal to the total number of model inputs in the batch), it becomes increasingly likely that each possible joint classification of n-tuples of model inputs will occur either once or never in the classification matrix E, which can result in an inaccurate entropy estimate for the batch.

Figure 5:
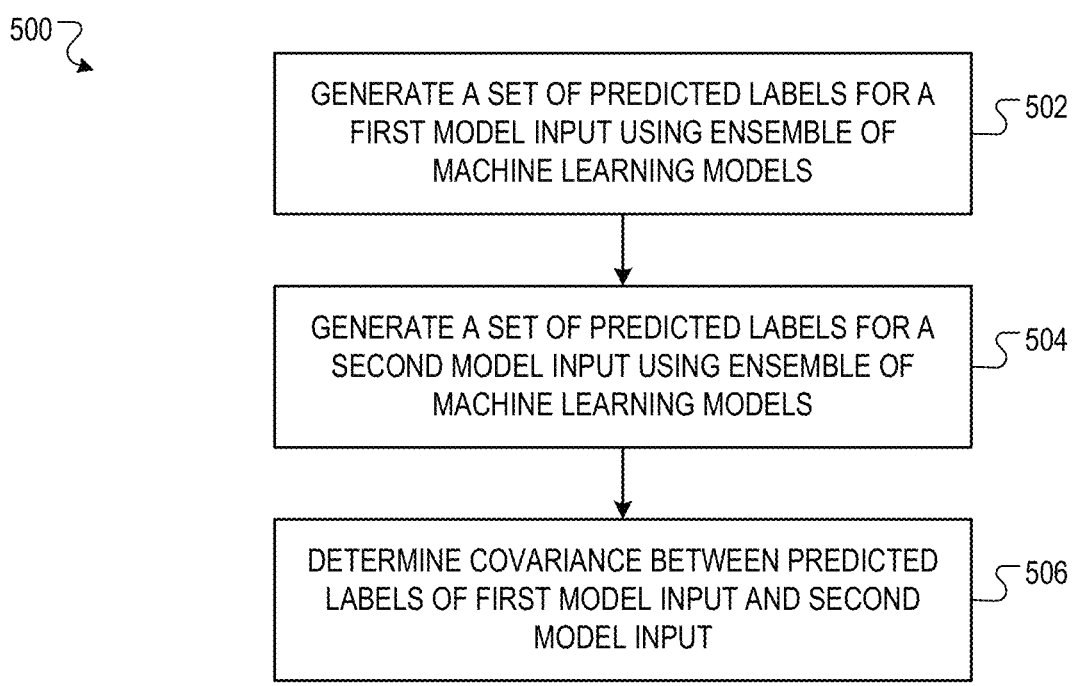
FIG. 5 is a flow diagram of an example process for determining a covariance between predicted labels of a pair of model inputs using an ensemble of machine learning models.

FIG. 5 is a flow diagram of an example process 500 for determining a covariance between predicted labels of a pair of model inputs using an ensemble of machine learning models. For convenience, the process 500 will be described as being performed by a system of one or more computers located in one or more locations. For example, a training system, e.g., the training system 100 of FIG. 1, appropriately programmed in accordance with this specification, can perform the process 500.

The ensemble of machine learning models referenced in the description of FIG. 5 can include any appropriate number of machine learning models, e.g., 5 machine learning models, or 10 machine learning models, or 100 machine learning models. Each machine learning model in the ensemble differs from each other machine learning model in the ensemble, e.g., as a result of having different parameter values, or a different architecture, or both. A few example techniques for generating the ensemble of machine learning models are described next.

In some implementations, at each training iteration, the system trains an ensemble of multiple machine learning models, i.e., rather than only a single machine learning model. Each machine learning model in the ensemble can be trained based on a different subset of the training data, or can have differently initialized parameter values, or both, than each other machine learning model in the ensemble.

In some implementations, the machine learning model includes a neural network, and each machine learning model in the ensemble is determined by dropping a respective set of parameters from the neural network. "Dropping" a parameter from the neural network can refer to setting the value of the parameter to a default value, e.g., zero, or to a random value, e.g., a value sampled from a Gaussian distribution. The system can randomly sample the set of parameters to be dropped from the neural network in order to generate each machine learning model in the ensemble. For instance, for each parameter in the neural network and for each machine learning model in the ensemble, the system can determine whether to drop the parameter from the machine learning model based on sampling from a probability distribution, e.g., a Bernoulli distribution.

Given the ensemble of machine learning models, the system generates a respective predicted label of the first model input using each machine learning model in the ensemble (502).

The system generates a respective predicted label of the second model input using each machine learning model in the ensemble (504).

The system generates the covariance for the pair of model inputs based on: (i) the set of predicted labels for the first model input, and (ii) the set of predicted labels for the second model input (506). For instance, the system can compute the covariance for the pair of model inputs as:

$$\frac{1}{n}\sum_{i=1}^{n}(x_i - \mu_x)(y_i - \mu_y) \quad (1)$$

where n is the number of machine learning models in the ensemble, $x_i$ is the predicted label for the first model input generated by machine learning model i, $\mu_x$ is the mean of the predicted labels for the first model input, $y_i$ is the predicted label for the second model input generated by machine learning model i, and $\mu_y$ is the mean of the predicted labels of the second model input.

Figure 6:
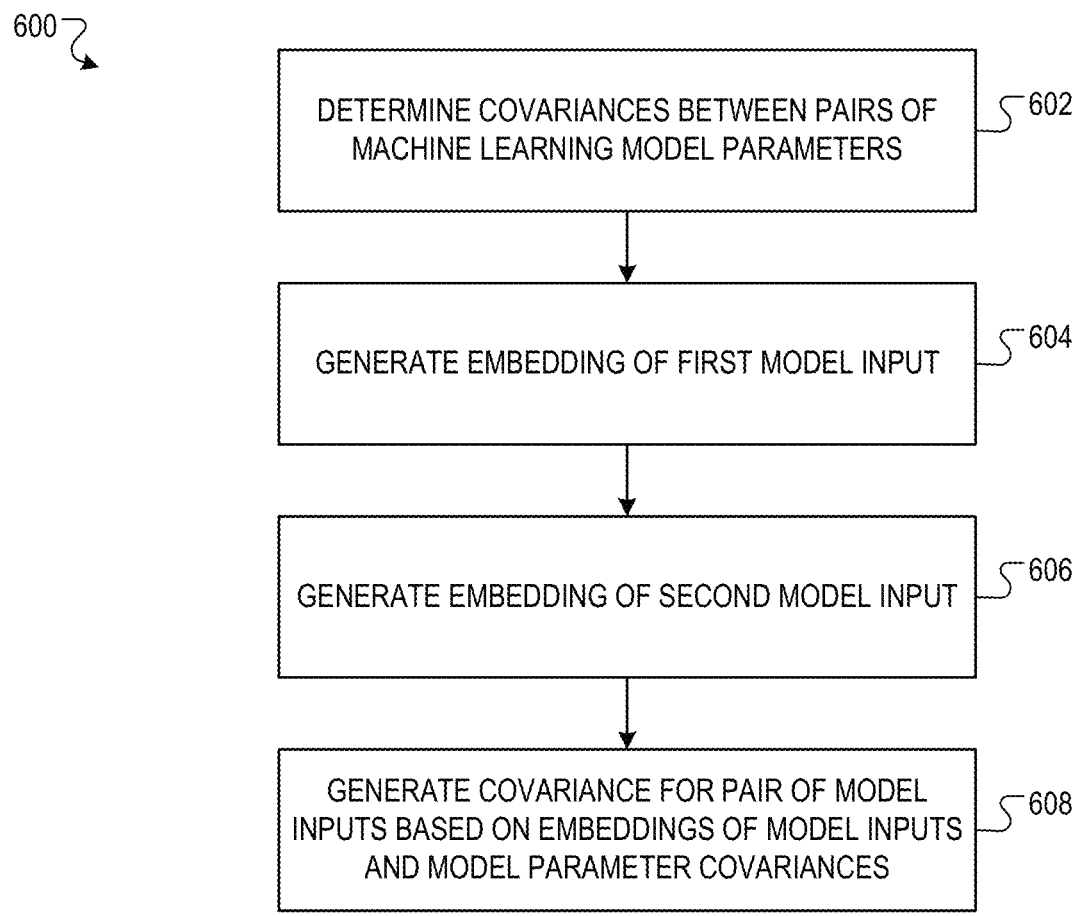
FIG. 6 is a flow diagram of an example process for determining a covariance between predicted labels of a pair of model inputs based on covariances between pairs of model parameters of the machine learning model.

FIG. 6 is a flow diagram of an example process 600 for determining a covariance between predicted labels of a pair of model inputs based on covariances between pairs of model parameters of the machine learning model. For convenience, the process 600 will be described as being performed by a system of one or more computers located in one or more locations. For example, a training system, e.g., the training system 100 of FIG. 1, appropriately programmed in accordance with this specification, can perform the process 600.

The system determines, for each of multiple pairs of model parameters from a set of model parameters of the machine learning model, a respective covariance between: (i) a first model parameter of the pair of model parameters, and (ii) a second model parameter of the pair of model parameters (602). In particular, each model parameter of the machine learning model is associated with a distribution over a space of possible values of the model parameter, e.g., as a result of uncertainty in the value of the model parameter. (The uncertainty in the value of a model parameter of the machine learning model can arise, e.g., because the current value of the model parameter defines an uncertain estimate for the "target" value of the model parameter that would globally optimize an objective function). Thus each model parameter defines a random variable over the space of possible values of the model parameter. The "covariance" between a pair of model parameters thus refers to a covariance between a pair of random variables corresponding to the pair of model parameters. The covariances of pairs of model parameters of the machine learning model can be represented as a covariance matrix, e.g., where entry (i, j) of the covariance matrix defines the covariance between model parameter i and model parameter j.

The system can determine covariances between pairs of model parameters of the machine learning model in any of a variety of possible ways. For instance, for each of multiple pairs of model parameters from a set of model parameters of the machine learning model, the system can determine a respective second derivative of an objective function with respect to the pair of model parameters. (The objective function can be the same objective function that is used during training of the machine learning model, as described above with reference to FIG. 2). The second derivatives of the objective function with respect to pairs of model parameters of the machine learning model can be represented as a Hessian matrix, e.g., where entry (i, j) of the Hessian matrix defines the second derivative of the objective function with respect to model parameter i and model parameter j. The system can then determine a covariance matrix 2 of covariances between pairs of model parameters based on the Hessian matrix, e.g., in accordance with the following equation:

$$\Sigma = (\nabla_\theta^2 \mathcal{L}(\mathcal{D}; \theta))^{-1} \quad (2)$$

where $\nabla_\theta^2 \mathcal{L}(\mathcal{D}; \theta)$ denotes the Hessian matrix and $(\cdot)^{-1}$ denotes a matrix inverse operation.

In a particular example, the machine learning model can be implemented as a neural network that includes: (i) an embedding subnetwork that is configured to process a model input to generate an embedding of the model input, and (ii) an output layer that is configured to process the embedding of the model input to generate a predicted label for the model input. In this example, the system can generate a Hessian matrix of second derivatives of the objective function with respect to pairs of model parameters of the output layer of the neural network, e.g., using second-order backpropagation. The system can then process the Hessian matrix to generate a covariance matrix of covariances of pairs of model parameters of the output layer of the neural network, e.g., in accordance with equation (2).

The system generates an embedding of the first model input using the machine learning model (604). For instance, for a machine learning model implemented as a neural network (as described above), the system can process the first model input using the embedding subnetwork of the neural network to generate the embedding of the first model input.

The system generates an embedding of the second model input using the machine learning model (606). For instance, for a machine learning model implemented as a neural network (as described above), the system can process the second model input using the embedding subnetwork of the neural network to generate the embedding of the second model input.

The system generates the covariance of the predicted labels of the pair of model inputs using: (i) the embedding of the first model input, (ii) the embedding of the second model input, and (iii) the covariance matrix of covariances of pairs of model parameters of the machine learning model (608). For instance, the system can generate the covariance C of the predicted labels of the pair of model inputs in accordance with the following equation:

$$C = E_1^T \cdot \sum \cdot E_2 \qquad (3)$$

where $E_1$ is the embedding of the first model input, $\Sigma$ is the covariance matrix of covariances of model parameters of the machine learning model, and $E_2$ is the embedding of the second model input.

Figure 7:
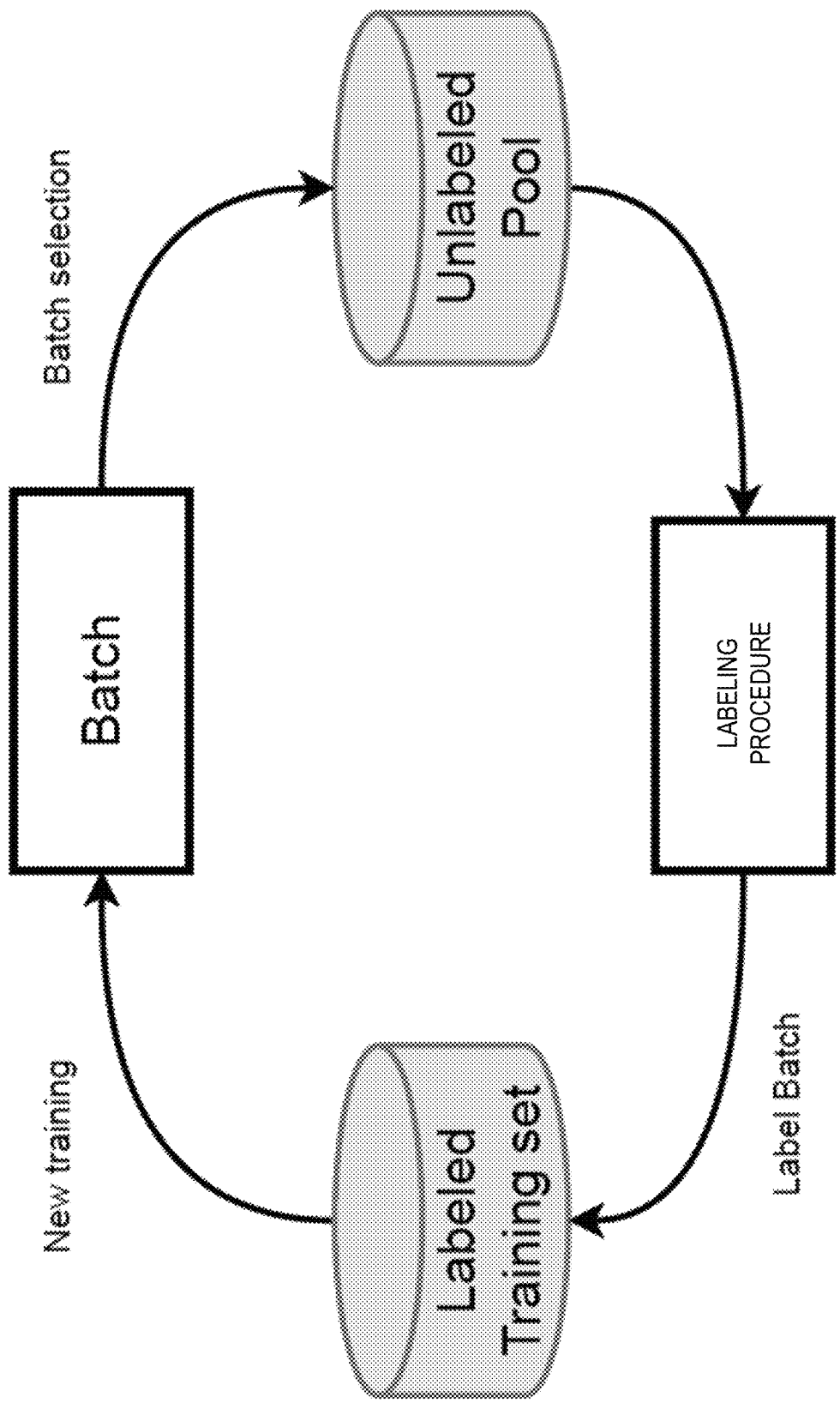
FIG. 7 illustrates an example of the active learning loop implemented by the training system.

FIG. 7 illustrates an example of the active learning loop implemented by the training system described in this specification. During each iteration of the active learning loop, the training system selects a batch of model inputs from the unlabeled pool of model inputs (e.g., for which target labels may be unknown), obtains target labels for the selected batch, and trains the machine learning model using at least the selected batch of model inputs and the associated target labels.

Figure 8:
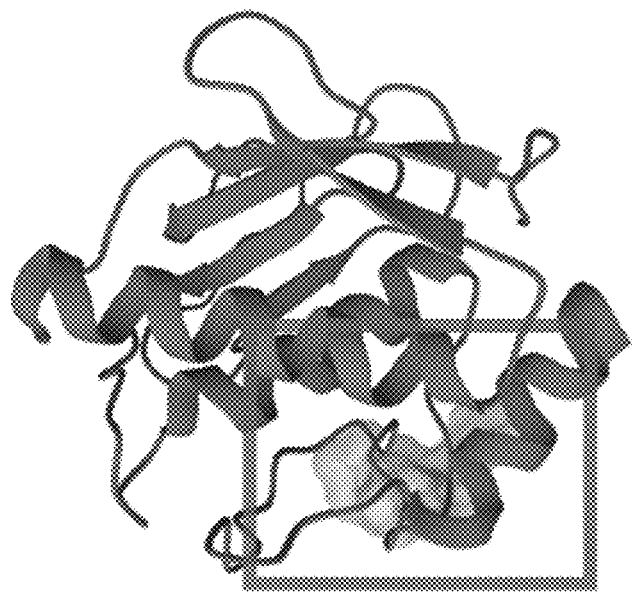
FIG. 8 illustrates an example of a ligand and a protein.
Figure 8:
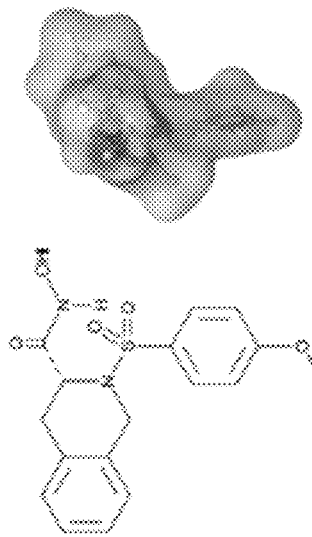
Figure 8:
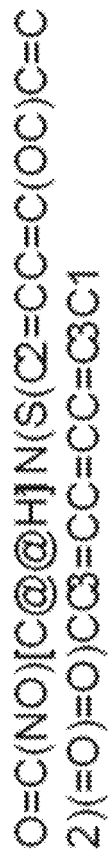

FIG. 8 illustrates an example of a ligand and a protein. The training system described in this specification can train a machine learning model to perform a machine learning such as, e.g., processing a model input that characterizes a ligand and a protein to generate a predicted label that defines a predicted binding affinity of the ligand for the protein.

FIG. 9 shows a table of results that compares the performance of the various implementations of the training system described in this specification alternative training systems. "COVDROP" refers to an implementation of the training system where the covariance matrix characterizing covariances between predicted labels of pairs of model inputs is determined using the process described with reference to FIG. 5. "COVLAP" refers to an implementation of the training system where the covariance matrix characterizing covariances between predicted labels of pairs of model inputs is determined using the process described with reference to FIG. 6. The alternative systems are denoted "k-means," "BAIT," "Random," and "Chron." "NC" refers to the number of compounds in the corresponding dataset. The numbers in the table (except for those in the "% gain" column) define the number of experiments required to achieve a threshold prediction accuracy using the corresponding training system for model inputs from the corresponding dataset. The "% gain" column defines the performance improvement of "COVDROP" (implemented by the training system described in this specification) compared to "Random" (a random batch selection policy).

FIG. 10 illustrates an example of selecting a batch of model inputs ("selected sequences") for training a machine learning model from among a pool of candidate model inputs ("candidate sequences"). The training system described in this specification can select a batch of model inputs for training the machine learning model based on both: (i) an uncertainty of the machine learning model in generating predicted labels for the model inputs in the batch of model inputs, and (ii) a diversity of the model inputs in the candidate batch of model inputs. The system can implement a batch selection policy that further encourages the selection of batches of model inputs predicted to have higher performance, e.g., predicted labels with higher values, as described with reference to FIG. 4A-4B. The scatter plot in FIG. 10 shows "predicted performance" (e.g., predicted label) on the vertical axis and "model uncertainty" (e.g., measured as the variance of the distribution of predicted labels) on the horizontal axis. It will be appreciated that, in this example, the training system tends to select model inputs associated with both high model uncertainty and high predicted performance for inclusion in the batch of model inputs for training the machine learning model.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   training a machine learning model over a sequence of training iterations, comprising, at each of a plurality of training iterations in the sequence of training iterations:
   selecting a current batch of model inputs for training the machine learning model at the training iteration, wherein the current batch of model inputs comprises a plurality of model inputs, wherein selecting the current batch of model inputs comprises:
      generating a set of candidate batches of model inputs;
      generating, for each candidate batch of model inputs, a respective score for the candidate batch of model inputs that characterizes:
         (i) an uncertainty of the machine learning model in generating predicted labels for the model inputs in the candidate batch of model inputs, and
         (ii) a diversity of the model inputs in the candidate batch of model inputs;
      wherein for each candidate batch of model inputs, generating the score for the candidate batch of model inputs comprises:
         identifying a plurality of pairs of model inputs that each include a respective first model input and a respective second model input from the candidate batch of model inputs;
         determining, for each pair of model inputs in the candidate batch of model inputs, a respective covariance between: (i) a predicted label for a first model input in the pair of model inputs, and (ii) a predicted label for a second model input in the pair of model inputs; and
         generating the score for the candidate batch of model inputs based on the respective covariance for each pair of model inputs in the candidate batch of model inputs; and
      selecting the current batch of model inputs from the set of candidate batches of model inputs based on the scores;
   obtaining a respective target label for each model input in the current batch of model inputs, wherein a target label for a model input defines a model output that should be generated by the machine learning model by processing the model input; and
   training the machine learning model on at least the current batch of model inputs using the target labels for the current batch of model inputs; and
   outputting the trained machine learning model.

2. The method of claim 1, wherein generating the score for the candidate batch of model inputs based on the respective covariance for each pair of model inputs in the candidate batch of model inputs comprises:
   generating a determinant of a covariance matrix that comprises the respective covariance for each pair of model inputs in the candidate batch of model inputs; and
   determining the score for the candidate batch of model inputs based on the determinant of the covariance matrix.

3. The method of claim 2, wherein determining the score for the candidate batch of model inputs based on the determinant of the covariance matrix comprises:
   applying a logarithm to the determinant of the covariance matrix.

4. The method of claim 1, wherein for each pair of model inputs in the candidate batch of model inputs, determining the covariance for the pair of model inputs comprises:
   generating a plurality of predicted labels for the first model input in the pair of model inputs using an ensemble of machine learning models;
   generating a plurality of predicted labels for the second model input in the pair of model inputs using the ensemble of machine learning models; and
   determining the covariance for the pair of model inputs based on: (i) the plurality of predicted labels for the first model input, and (ii) the plurality of predicted labels for the second model input.

5. The method of claim 4, wherein the machine learning model is a neural network and the ensemble of machine learning models comprises a plurality of modified neural networks,
   wherein each modified neural network in the ensemble of machine learning models is a modified version of the neural network.

6. The method of claim 5, wherein each modified neural network in the ensemble of machine learning models is determined by dropping a respective set of parameters from the neural network.

7. The method of claim 1, wherein generating the respective covariance for each pair of model inputs in the candidate batch of model inputs comprises:
   determining, for each of a plurality of pairs of model parameters of the machine learning model, a respective covariance between: (i) a first model parameter of the pair of model parameters, and (ii) a second model parameter of the pair of model parameters; and
   generating the covariances for the pairs of model inputs based on the covariances for the pairs of model parameters of the machine learning model.

8. The method of claim 7, wherein the machine learning model is a neural network that comprises an: (i) an embedding subnetwork that is configured to process a model input to generate an embedding of the model input, and (ii) output layer that is configured to process the embedding of the model input to generate a predicted label for the model input.

9. The method of claim 8, wherein generating the covariances for the pairs of model inputs based on the covariances for the pairs of model parameters of the machine learning model comprises, for each pair of model inputs comprising a first model input and a second model input:
generating an embedding of the first model input using the embedding subnetwork;
generating an embedding of the second model input using the embedding subnetwork; and
generating the covariance for the pair of model inputs based on the embedding of the first model input, the embedding of the second model input, and covariances for pairs of model parameters included in the output layer of the machine learning model.

10. The method of claim 9, wherein for each pair of model inputs comprising a first model input and a second model input, generating the covariance for the pair of model inputs comprises:
computing a matrix product between: (i) the embedding of the first model input, (ii) a covariance matrix that comprises the covariances for pairs of model parameters included in the output layer of the machine learning model, and (iii) the embedding of the second model input.

11. The method of claim 7, wherein determining, for each of the plurality of pairs of model parameters of the machine learning model, the respective covariance between: (i) the first model parameter of the pair of model parameters, and (ii) the second model parameter of the pair of model parameters, comprises:
determining, for each of the plurality of pairs of model parameters of the machine learning model, a respective second derivative of an objective function with respect to the pair of model parameters, wherein the machine learning model has been trained to optimize the objective function; and
processing the second derivatives of the objective function with respect to the pairs of model parameters to generate the covariances of the pairs of model parameters.

12. The method of claim 1, wherein for each pair of model inputs in the candidate batch of model inputs, determining the covariance for the pair of model inputs comprises:
determining a quality measure of a first model input in the pair of model inputs based on a value of a predicted label for the first model input relative to values of predicted labels for each other model input in the candidate batch of model inputs;
determining a quality measure of a second model input in the pair of model inputs based on a value of a predicted label for the second model input relative to values of predicted labels for each other model input in the candidate batch of model inputs; and
modifying the covariance for the pair of model inputs based on: (i) the quality measure of the first model input, and (ii) the quality measure of the second model input.

13. The method of claim 12, wherein the quality measure of the first model input is based on a quantile of the value of the predicted label for the first model input in a set of values that comprises a respective value of a predicted label for each model input in the candidate batch of model inputs.

14. The method of claim 12, wherein the quality measure of the second model input is based on a quantile of the value of the predicted label for the second model input in a set of values that comprises a respective value of a predicted label for each model input in the candidate batch of model inputs.

15. The method of claim 12, wherein modifying the covariance for the pair of model inputs comprises scaling the covariance for the pair of model inputs by the quality measure of the first model input and the quality measure of the second model input.

16. The method of claim 1, further comprising, at each of a plurality of training iterations in the sequence of training iterations:
after training the machine learning model on the current batch of model inputs, providing the machine learning model for further training at a next training iteration in the sequence of training iterations.

17. The method of claim 1, wherein the machine learning model is a neural network.

18. The method of claim 17, wherein the neural network comprises one or more message passing neural network layers.

19. The method of claim 1, wherein at each of the plurality of training iterations, training the machine learning model on at least the current batch of model inputs using the target labels for the current batch of model inputs comprises, for each model input in the current batch of model inputs:
training the machine learning model to process the model input to generate a predicted label that matches the target label for the model input.

20. The method of claim 19, wherein training the machine learning model to process the model input to generate a predicted label that matches the target label for the model input comprises:
training the machine learning model to optimize an objective function that measures an error between: (i) the predicted label generated by the machine learning model for the model input, and (ii) the target label for the model input.

21. The method of claim 1, wherein generating a set of candidate batches of model inputs comprises:
generating a pool of model inputs;
determining a respective uncertainty score for each model input in the pool of model inputs, wherein the uncertainty score for a model input characterizes an uncertainty of the machine learning model in generating a predicted label for the model input;
determining a probability distribution over the pool of model inputs using the uncertainty scores for the model inputs; and
generating the set of candidate batches of model inputs using the probability distribution over the pool of model inputs.

22. A system comprising:
one or more computers; and
one or more storage devices communicatively coupled to the one or more computers, wherein the one or more storage devices store instructions that, when executed by the one or more computers, cause the one or more computers to perform operations comprising:
training a machine learning model over a sequence of training iterations, comprising, at each of a plurality of training iterations in the sequence of training iterations:
selecting a current batch of model inputs for training the machine learning model at the training iteration, wherein the current batch of model inputs comprises a plurality of model inputs, wherein selecting the current batch of model inputs comprises:
generating a set of candidate batches of model inputs;

generating, for each candidate batch of model inputs, a respective score for the candidate batch of model inputs that characterizes:
   (i) an uncertainty of the machine learning model in generating predicted labels for the model inputs in the candidate batch of model inputs, and
   (ii) a diversity of the model inputs in the candidate batch of model inputs;
wherein for each candidate batch of model inputs, generating the score for the candidate batch of model inputs comprises:
   identifying a plurality of pairs of model inputs that each include a respective first model input and a respective second model input from the candidate batch of model inputs;
   determining, for each pair of model inputs in the candidate batch of model inputs, a respective covariance between: (i) a predicted label for a first model input in the pair of model inputs, and (ii) a predicted label for a second model input in the pair of model inputs; and
   generating the score for the candidate batch of model inputs based on the respective covariance for each pair of model inputs in the candidate batch of model inputs; and
selecting the current batch of model inputs from the set of candidate batches of model inputs based on the scores;
obtaining a respective target label for each model input in the current batch of model inputs, wherein a target label for a model input defines a model output that should be generated by the machine learning model by processing the model input; and
training the machine learning model on at least the current batch of model inputs using the target labels for the current batch of model inputs; and
outputting the trained machine learning model.

23. One or more non-transitory computer storage media storing instructions that when executed by one or more computers cause the one or more computers to perform operations comprising:
training a machine learning model over a sequence of training iterations, comprising, at each of a plurality of training iterations in the sequence of training iterations:
selecting a current batch of model inputs for training the machine learning model at the training iteration, wherein the current batch of model inputs comprises a plurality of model inputs, wherein selecting the current batch of model inputs comprises:
   generating a set of candidate batches of model inputs;
   generating, for each candidate batch of model inputs, a respective score for the candidate batch of model inputs that characterizes:
     (i) an uncertainty of the machine learning model in generating predicted labels for the model inputs in the candidate batch of model inputs, and
     (ii) a diversity of the model inputs in the candidate batch of model inputs;
   wherein for each candidate batch of model inputs, generating the score for the candidate batch of model inputs comprises:
     identifying a plurality of pairs of model inputs that each include a respective first model input and a respective second model input from the candidate batch of model inputs;
     determining, for each pair of model inputs in the candidate batch of model inputs, a respective covariance between: (i) a predicted label for a first model input in the pair of model inputs, and (ii) a predicted label for a second model input in the pair of model inputs; and
     generating the score for the candidate batch of model inputs based on the respective covariance for each pair of model inputs in the candidate batch of model inputs; and
   selecting the current batch of model inputs from the set of candidate batches of model inputs based on the scores;
obtaining a respective target label for each model input in the current batch of model inputs, wherein a target label for a model input defines a model output that should be generated by the machine learning model by processing the model input; and
training the machine learning model on at least the current batch of model inputs using the target labels for the current batch of model inputs; and
outputting the trained machine learning model.

24. A method performed by one or more computers, the method comprising:
training a machine learning model over a sequence of training iterations, comprising, at each of a plurality of training iterations in the sequence of training iterations:
selecting a current batch of model inputs for training the machine learning model at the training iteration, wherein the current batch of model inputs comprises a plurality of model inputs, wherein selecting the current batch of model inputs comprises:
   generating a set of candidate batches of model inputs;
   generating, for each candidate batch of model inputs, a respective score for the candidate batch of model inputs that characterizes:
     (i) an uncertainty of the machine learning model in generating predicted labels for the model inputs in the candidate batch of model inputs, and
     (ii) a diversity of the model inputs in the candidate batch of model inputs;
   wherein for each candidate batch of model inputs, generating the score for the candidate batch of model inputs comprises:
     obtaining, for each model input in the candidate batch of model inputs, a set of classifications of the model input that includes a respective classification generated for the model input by each machine learning model in an ensemble of machine learning models; and
     processing the sets of classifications of the model inputs in the candidate batch of model inputs to generate the score for the candidate batch of model inputs as an approximation of an entropy of the candidate batch of model inputs; and
   selecting the current batch of model inputs from the set of candidate batches of model inputs based on the scores;
obtaining a respective target label for each model input in the current batch of model inputs, wherein a target label for a model input defines a model output that should be generated by the machine learning model by processing the model input; and
training the machine learning model on at least the current batch of model inputs using the target labels for the current batch of model inputs; and outputting the trained machine learning model.

25. The method of claim 24, wherein processing the sets of classifications of the model inputs in the candidate batch of model inputs to generate the score for the candidate batch of model inputs as an approximation of an entropy of the candidate batch of model inputs comprises:

processing the sets of classifications of the model inputs in the candidate batch of model inputs to generate, for each n-tuple of model inputs from the candidate batch of model inputs, a respective probability distribution over a space of possible joint classifications of model inputs in the n-tuple of model inputs; and processing the probability distributions for the n-tuples of model inputs in the candidate batch of model inputs to generate the score for the candidate batch of model inputs.

26. The method of claim 25, wherein each n-tuple of model inputs is a two-tuple of model inputs comprising a first model input and a second model input from the candidate batch of model inputs.

27. The method claim 25, wherein processing the probability distributions for the n-tuples of model inputs in the candidate batch of model inputs to generate the score for the candidate batch of model inputs comprises:

generating, for each n-tuple of model inputs from the candidate batch of model inputs, a respective joint entropy of the model inputs in the n-tuple of model inputs based on the probability distribution over the space of joint classifications of model inputs in the n-tuple of model inputs; and generating the score for the candidate batch of model inputs by combining the joint entropies of the model inputs in the n-tuples of model inputs from the candidate batch of model inputs.

28. The method of claim 27, wherein generating the score for the candidate batch of model inputs by combining the joint entropies of the model inputs in the n-tuples of model inputs from the candidate batch of model inputs comprises:

summing the joint entropies of the model inputs in the n-tuples of model inputs from the candidate batch of model inputs.

29. The method of claim 24, further comprising, at each of a plurality of training iterations in the sequence of training iterations:

after training the machine learning model on the current batch of model inputs, providing the machine learning model for further training at a next training iteration in the sequence of training iterations.

30. The method of claim 24, wherein the machine learning model is a neural network.

* * * * *